(12) United States Patent
Yukawa

(10) Patent No.: US 7,990,832 B2
(45) Date of Patent: Aug. 2, 2011

(54) OPTICAL PICKUP INCLUDING PLURAL LIGHT SOURCES AND RECORDING AND/OR REPRODUCING APPARATUS FOR AN OPTICAL RECORDING MEDIUM

(75) Inventor: Hiroaki Yukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1158 days.

(21) Appl. No.: 11/106,432

(22) Filed: Apr. 15, 2005

(65) Prior Publication Data

US 2005/0243686 A1    Nov. 3, 2005

(30) Foreign Application Priority Data

Apr. 28, 2004 (JP) ................................. 2004-134328
Apr. 4, 2005 (JP) ................................. 2005-107852

(51) Int. Cl.
*G11B 7/135* (2006.01)
*G11B 7/00* (2006.01)

(52) U.S. Cl. .............................. 369/112.04; 369/112.05

(58) Field of Classification Search ............ 369/112.03–112.08, 112.11–112.13
See application file for complete search history.

(56) References Cited

U.S. PATENT DOCUMENTS

| | | | | | |
|---|---|---|---|---|---|
| 5,611,965 | A | * | 3/1997 | Shouji et al. | 359/885 |
| 5,930,220 | A | * | 7/1999 | Shimano et al. | 369/44.23 |
| 2004/0022164 | A1 | * | 2/2004 | Nishioka et al. | 369/112.05 |
| 2004/0130804 | A1 | * | 7/2004 | Mimori | 359/719 |
| 2004/0202088 | A1 | * | 10/2004 | Oohchida | 369/112.16 |
| 2004/0213131 | A1 | * | 10/2004 | Kimura et al. | 369/112.03 |
| 2005/0018297 | A1 | * | 1/2005 | Ohta et al. | 359/566 |

FOREIGN PATENT DOCUMENTS

| | | | |
|---|---|---|---|
| JP | 2002279667 A | * | 9/2002 |
| JP | 2005-38585 | | 2/2005 |
| JP | 2005-85340 | | 3/2005 |
| WO | WO 01/26103 A1 | | 4/2001 |

OTHER PUBLICATIONS

Machine-assisted translation of JP 2002-279667 A.*

* cited by examiner

*Primary Examiner* — Wayne R Young
*Assistant Examiner* — Nathan A Danielsen
(74) *Attorney, Agent, or Firm* — Oblon, Spivak, McClelland, Maier & Neustadt, L.L.P.

(57) ABSTRACT

The present invention provides an optical pickup in which the transmission diffraction efficiency of plural recording and/or reproducing light beams of different wavelengths, radiated from plural light sources, may be prevented from being lowered, and in which the transmission diffraction efficiency and the angle of diffraction are both optimized. The optical pickup includes an imaging unit composed of an objective lens and a set of diffraction section and adapted for condensing light beams from first to third light sources on optical recording mediums, and the set of diffraction section includes a first diffraction section which gives the transmission diffraction efficiency for order-one diffracted light or order-minus-one diffracted light higher than that for light of the other orders in case light beams of first, second and third wavelengths are transmitted therethrough, and a second diffraction section which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for diffracted light of the other orders in case the remaining light beam is transmitted therethrough.

10 Claims, 14 Drawing Sheets

OPTICAL PICKUP INCLUDING PLURAL LIGHT SOURCES AND RECORDING AND/OR REPRODUCING APPARATUS FOR AN OPTICAL RECORDING MEDIUM

CROSS REFERENCES TO RELATED APPLICATIONS

The present invention contains subject matter related to Japanese Patent Application JP 2004-134328 filed in the Japanese Patent Office on Apr. 28, 2004, and Japanese Patent Application JP 2005-107852 filed in the Japanese Patent Office on Apr. 4, 2005, the entire contents of which being incorporated herein by reference.

BACKGROUND OF THE INVENTION

1. Field of the Invention

This invention relates to an optical system for recording and/or reproducing an optical recording medium and, more particularly, to an optical pickup and to a recording and/or reproducing apparatus for an optical recording medium capable of writing and reading out data for plural recording mediums using plural recording and/or reproducing wavelengths.

2. Description of Related Art

Recently, recording mediums, such as CD (Compact Disc), MD (Mini-Disc) and DVD (Digital Versatile Disc), are required to be further increased in capacity. In order to meet this demand, a variety of techniques have so far been proposed. On the other hand, a sole medium is required to be able to freely record and/or reproduce variegated data, such as, for example, music contents data, image contents data or data for computers. Above all, a novel disc format employing the laser of a wavelength band of 405 nm, referred to below as a Blue-Ray Disc (BD), is stirring up notice as representing the next-generation recording technique.

In developing universally employed mediums, compatibility and matching performance between a recording and/or reproducing apparatus for a new medium and one for an old medium, are crucial, such that newly developed recording and/or reproducing apparatus are desirably capable of exploiting conventional resources, such as DVD or CD. However, it is not that easy to implement an apparatus which will provide for compatibility between mediums having disc structures and concomitant laser specifications different from each other.

The simplest method is to provide different optical systems and to switch between dedicated objective lenses from one wavelength to another. However, a switching mechanism for switching between plural sorts of the objective lenses is needed in such case, thus leading to increased cost. An actuator becoming bulky is deterrent to size reduction of the apparatus. For this reason, a multiple wavelength interchange optical system, in which part of the optical system, such as an objective lens, is co-owned, has been in use. However, in such case, spherical aberration generated increases in proportion to the thickness of a protective substrate designed to protect the recording surface, with the result that, with the conventional single lens, it is difficult to condense light beams of different wavelengths on the recording surfaces through protective substrates of different thicknesses in a substantially aberration-free fashion.

Thus, as a system for correcting the spherical aberration, in a conventional dual wavelength inter-changing system for coping with recording and/or reproduction of two recording mediums, having different protective substrate thicknesses, a diffraction system for allowing a specified wavelength to be incident with diffraction, by employing an optical element, such as a diffraction element, or without diffraction, on an objective lens, or a multiplication factor converting system in which the optical path length is rendered finite to change the multiplication factor, has so far been used.

With the dual wavelength inter-changing system, the diffractive element may be designed, by combining a certain curved lens surface with the diffractive element (two degrees of freedom) such as to satisfy the optimum value of the combination of the two different protective substrate thicknesses and the recording and/or reproducing wavelengths (two degrees of freedom), thereby solving the above problem.

However, if it is tried to implement three-wavelength compatibility among DVD, CD and e.g. the aforementioned BD of the new format, there are three combinations each of the protective substrate thicknesses and wavelengths that need to be optimized, with the result that, with the technology employing a sole diffractive element, the degrees of freedom fall short and hence the transmission diffraction efficiency and the angle of diffraction cannot be optimized simultaneously with ease. In the former system by diffraction, the spherical aberration among the three wavelengths can be corrected by employing plural angles of diffraction. However, in this case, the transmission diffraction efficiency is lowered significantly depending on the shape of the diffraction grating and grating characteristics. The latter system by multiplication factor conversion, laser light beams of different wavelengths need to be arranged at different multiplication factor positions, so that the lasers cannot be placed with ease in one and the same casing, in a manner unmeritorious to reducing the apparatus size. In addition, the performance of the objective lens in movement along the tracking direction is lowered significantly.

In case of the BD, it is relatively easy to design an objective lens, achieving the light utilization efficiency not lower than 95%, in case a dedicated objective lens, intended to be used for the BD by itself, is used. However, if it is tried to provide for compatibility with the DVD (Digital Versatile Disc) and CD (Compact Disc), as conventional resources, many problems arise. Here, a case of extending the dual wavelength compatible optical system for the BD and the DVD, for which compatibility has already been achieved to a certain extent, for use with a light beam for a CD, is explained, as an example.

As the dual wavelength compatible optical system for the BD and the DVD, there is, for example, such a system which is based on a light beam for recording and/or reproducing a BD and in which a light beam for BD incident on an objective lens is of an infinite system, while a light beam for CD and DVD being of a finite system. The infinite system means such a system in which a light beam falls on an objective lens from an infinitely remote distance, that is, as a collimated light beam on the objective lens, whilst the finite system means such a system in which a light beam falls as divergent light on the objective lens. The compatibility system by the finite and the infinite systems is meritorious in that the action of diffraction is not used so that light utilization efficiency is satisfactory, and also in that the focal length can be varied depending on the degree of divergence of the light beam incident on the objective lens and hence an optimum working distance can be achieved. However, since the light beam falls on the objective lens as divergent light (light of the finite system), there is not sufficient margin for transverse deflection of the objective lens with respect to the optical axis, with the result that the tracking margin tends to be affected significantly.

If, in a BD-DVD dual wavelength compatible optical system, a light beam for recording and/or reproducing a BD is used as a base beam, and an optical component, optimized to generate order-one light beams for both the BD and the DVD, is used, approximately 90% order-one diffracted light is generated for a light beam for BD (405 nm), however, only approximately 70% order-one diffracted light may be generated for a light beam for DVD (655 nm). Even though the system is satisfactory from the perspective of aberration characteristics, the transmission diffraction efficiency for the light beam for DVD is that low to degrade the light utilization efficiency. Moreover, it is difficult with this system to provide for compatibility with the light beam for CD (785 nm).

If, in a BD-DVD dual wavelength compatible optical system, a light beam for recording and/or reproducing a BD is used as a base beam, and an optical component, optimized to generate order-two diffracted light for BD and order-one diffracted light for DVD, is used, the transmission diffraction efficiency of approximately 90% may be achieved for order-two diffracted light for BD and order-one diffracted light for DVD, thus achieving satisfactory light utilization efficiency. However, this system suffers from marked wavelength dependency of the spherical aberration and difficulty in achieving compatibility with the light beam for CD (785 nm).

FIG. 1 schematically shows characteristics in case of employing the aforementioned BD-DVD dual wavelength compatible optical system. In FIG. 1, the ordinate and the abscissa denote thicknesses of the protective substrates protecting the recording surfaces of the optical discs and wavelength bands of light beams used, respectively. Since the amounts of the spherical aberration generated are proportional to the thicknesses of the protective substrates and the angles of diffraction are proportionate to the wavelengths, FIG. 1 also shows the relationship between the amounts of the spherical aberration and the angles of diffraction for respective wavelengths.

As may be seen from FIG. 1, if the order-one diffracted light for CD is incident on an optical system employing a light beam for recording and/or reproducing the BD as a base beam and an optical component optimized to generate order-one diffracted light beams for both BD and DVD (BD/DVD/CD=order one/order one/order one), there is generated, in the BD-DVD compatible optical system, there is produced spherical aberration $SA_{111}$ that cannot be compensated for the light beam for CD, referred to herein as residual spherical aberration.

SUMMARY OF THE INVENTION

In view of the above depicted status of the art, it is desirable to provide an optical pickup in which the transmission diffraction efficiency of the recording and/or reproducing light beams of different wavelengths, generated from plural light sources, may be prevented from being lowered, and in which the transmission diffraction efficiency and the angle of diffraction may simultaneously be optimized for plural wavelengths, and a recording and/or reproducing apparatus for an optical recording medium employing this optical pickup.

For accomplishing the above object, the present invention provides an optical pickup including a first light source radiating a light beam of a first wavelength, a second light source radiating a light beam of a second wavelength, a third light source radiating a light beam of a third wavelength, and light receiving means for receiving the light beams from the first to third light sources, reflected from a plurality of optical recording mediums having different protective substrate thicknesses, and for converting the received light beams into electrical signals. The optical pickup radiates light beams of different wavelengths and different numerical apertures to the individual optical recording mediums, and comprises an imaging unit composed of an objective lens and a set of diffraction means and adapted for condensing the light beams from the first to third light sources on the optical recording mediums. The set of diffraction means includes first diffraction means which gives the transmission diffraction efficiency for order-one diffracted light or order-minus-one diffracted light higher than that for light of the other orders in case the light beams of the first, second and third wavelengths are transmitted therethrough, and second diffraction means which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for diffracted light of the other orders in case the remaining light beam is transmitted therethrough.

In the optical pickup, according to the present invention, collimated light falls on the imaging unit. One of the diffraction means of the set of diffraction means is a blade type diffraction element having a serrated cross-sectional shape and the other diffraction means is a stepped diffraction element having a stepped cross-sectional shape. In particular, the blade type diffraction element preferably has a groove depth such that the transmitted diffraction efficiency of the order-one or order-minus-one diffracted light is higher than that of diffracted light of the other orders in case the light beams of the first wavelength, second wavelength and the third wavelength are transmitted therethrough, while the stepped diffraction element preferably has a groove depth such that the transmitted diffraction efficiency of the order-zero diffracted light is higher than that of diffracted light of the other orders in case the light beam of the shortest wavelength and the light beam of the longest wavelength out of the light beams of the first to third wavelengths are transmitted therethrough, and also such that the transmitted diffraction efficiency of the order-one diffracted light or the order-minus-one diffracted light is higher than that of diffracted light of the other orders in case the remaining light beam is transmitted therethrough.

For accomplishing the above object, the present invention also provides an optical pickup including a first light source radiating a light beam of a first wavelength, a second light source radiating a light beam of a second wavelength, a third light source radiating a light beam of a third wavelength and light receiving means for receiving the light beams from the first to third light sources, reflected from a plurality of optical recording mediums having different protective substrate thicknesses, and for converting the received light beams into electrical signals. The optical pickup radiates light beams of different wavelengths and different numerical apertures to the individual optical recording mediums, and comprises an imaging unit composed of an objective lens and a set of diffraction means and adapted for condensing the light beams from the first to third light sources on the optical recording mediums. The set of diffraction means includes first diffraction means which gives the transmission diffraction efficiency for order-one diffracted light or order-minus-one diffracted light higher than that for light of the other orders in case the light beams of the first, second and third wavelengths are transmitted therethrough, and second diffraction means which gives the transmission diffraction efficiency for order-one diffracted light and for order-minus-one diffracted light higher than that for light of the other orders in case the light beam of the shortest wavelength out of the first, second and third wavelengths are transmitted therethrough, and the transmission diffraction efficiency for order-zero diffracted light higher than that for light of the other orders in case the remaining light beams are transmitted therethrough.

In the optical pickup according to the present invention, collimated light is incident on the imaging unit. The diffraction means of the set of diffraction means are each a blade type diffraction element having a serrated cross-sectional shape. One of the blade type diffraction elements of the set of diffraction means has a groove depth such that the transmitted diffraction efficiency of the order-one or order-minus-one diffracted light is higher than that of the diffracted light of the other orders in case the light beams of the first wavelength, second wavelength and the third wavelength are transmitted therethrough, and the other blade type diffraction element has a groove depth such that the transmitted diffraction efficiency of the order-one diffracted light or the order-minus one diffracted light is higher than that of the diffracted light of the other orders in case the light beam of the shortest wavelength out of the light beams of the first to third wavelengths is transmitted therethrough, and also such that the transmitted diffraction efficiency of the order-zero diffracted light is higher than that of the diffracted light of the other orders in case the remaining light beams are transmitted therethrough.

For accomplishing the above object, the present invention provides a recording and/or reproducing apparatus for an optical recording medium for rotationally driving each of a plurality of optical recording mediums having different protective substrate thicknesses, in which the apparatus comprises an optical pickup moved by feed means along the radius of the optical recording medium for carrying out recording and/or reproduction by light beams having different wavelengths and different numerical apertures, depending on the sorts of the optical recording mediums, and controls the rotation of the optical recording mediums and movement of the optical pickup in keeping with the recording and/or reproducing operation. The optical pickup includes an imaging unit composed of an objective lens and a set of diffraction means and adapted for condensing the light beams from the first to third light sources on the optical recording mediums. The set of diffraction means includes first diffraction means which gives the transmission diffraction efficiency for order-one diffracted light or order-minus-one diffracted light higher than that for diffracted light of the other orders in case the light beams of the first, second and third wavelengths are transmitted therethrough, and second diffraction means which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for light of the other orders in case the other light beam is transmitted therethrough.

For accomplishing the above object, the present invention provides a recording and/or reproducing apparatus for an optical recording medium for rotationally driving each of a plurality of optical recording mediums having different protective substrate thicknesses, in which the apparatus comprises an optical pickup moved by feed means along the radius of the optical recording medium for carrying out recording and/or reproduction by light beams having different wavelengths and different numerical apertures, depending on the sorts of the optical recording mediums, and controls the rotation of the optical recording mediums and movement of the optical pickup in keeping with the recording and/or reproducing operation. The optical pickup includes an imaging unit composed of an objective lens and a set of diffraction means and adapted for condensing the light beams from the first to third light sources on the optical recording mediums. The set of diffraction means includes first diffraction means which gives the transmission diffraction efficiency for order-one diffracted light or order-minus-one diffracted light higher than that for light of the other orders in case the light beams of the first, second and third wavelengths are transmitted therethrough, and second diffraction means which gives the transmission diffraction efficiency for order-one diffracted light or for order-minus-one diffracted light higher than that for light of the other orders in case the light beam of the shortest wavelength out of the first, second and third wavelengths is transmitted therethrough, and the transmission diffraction efficiency for order-zero diffracted light higher than that for the diffracted light of the other orders in case the remaining light beams are transmitted therethrough.

According to the present invention, the transmission diffraction efficiency of the recording and/or reproducing light beams of different wavelengths, generated from plural light sources, may be prevented from being lowered, while the transmission diffraction efficiency and the angle of diffraction may simultaneously be optimized for plural wavelengths.

DESCRIPTION OF THE PREFERRED EMBODIMENTS

Figure 1:
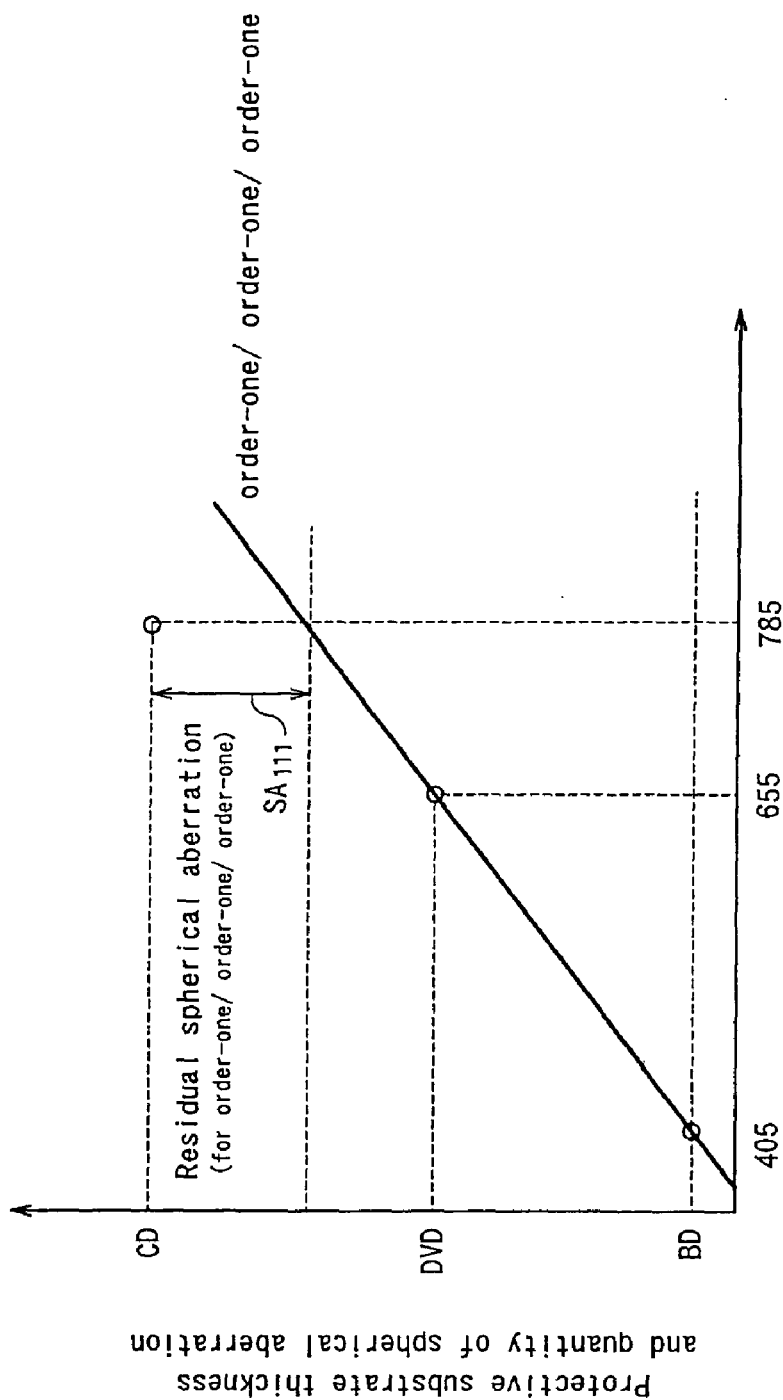
FIG. 1 is a graph illustrating the thickness of a protective substrate protecting a recording surface of an optical disc, a working wavelength band and the quantity of the spherical aberration generated.

Referring now to the drawings, certain preferred embodiments of the optical pickup according to the present invention will be explained in detail. First, an optical system of an optical pickup, shown as a first embodiment of the present invention, will be explained with reference to FIGS. 2 and 3. The recording surface of the optical disc, the objective lens and the diffractive part are shown enlarged in FIG. 3.

In the present first embodiment, a three-wavelength compatible optical system, in which a first optical disc 61 is a Blue-Ray disc (referred to below as a BD) employing a light beam 51 with a wavelength of 405 nm as recording and/or reproducing light, a second optical disc 62 is a DVD (Digital Versatile Disc), employing a light beam 52 with a wavelength of 655 nm as recording and/or reproducing light, and in which a third optical disc 63 is a CD (Compact Disc), employing a light beam 53 with a wavelength of 785 nm as recording and/or reproducing light, is explained.

In the present first embodiment, one of the diffractive elements of a set forming the image-forming unit is a blade type diffractive element having a serrated cross-section and the other is a stepped diffractive element having a stepped cross-section.

The optical pickup 1 is made up by a basic optical system, including a light source, a photodetector receiving the reflected light beam from a recording surface to read out light signals, a spectroscopic element for branching an outgoing light beam and a return light beam from each other, and devices for generating focusing signals or tracking signals, an objective lens 14 for condensing the light beam radiated from the light source to the recording surface of an optical disc, and a set of diffractive elements 15, 16, arranged directly ahead of the objective lens 14. In the optical pickup 1, the objective lens 14 and the set of the diffractive elements 15, 16 are fixed relative to each other as an imaging unit 17, and are driven by a sole actuator.

In the present first embodiment, the aforementioned basic optical system includes the aforementioned basic optical system 11, made up by a first light source, generating a light beam 51 for BD, with a wavelength of 405 nm, a photodetector for detecting the reflected light from the first optical disc 61, and a device for generating the focusing signals or tracking signals, based on the standard for BD. The basic optical system also includes a second basic optical system 12 providing for compatibility between the DVD and the CD. This second basic optical system includes a second light source for generating a light beam for DVD 52, having a wavelength of 655 nm, a photodetector for detecting the light reflected from the second optical disc 62, a third light source for generating a light beam 53 for a CD, having a wavelength of 785 nm, another photodetector for detecting the light reflected by the third optical disc 63, and a device for generating the focusing or tracking signals based on the standard for DVD or the CD.

The first light source, not shown, included in the first basic optical system 11, radiates the light beam 51 of a wavelength of 405 nm for recording and/or reproducing the BD, as a first wavelength. The second light source, also not shown, included in the second basic optical system 12, radiates the light beam 52 of a wavelength of 655 nm for recording and/or reproducing the DVD, as a second wavelength. The third light source is also included in the second basic optical system 12 and radiates the light beam 53 of a wavelength of 785 nm for recording and/or reproducing the CD, as a third wavelength.

The objective lens 14, as a lens of a so-called 2-zone system, is able to condense the light beam 51 of the first wavelength on the BD as the first optical disc 61 having a first protective substrate thickness 61a. The objective lens 14 is also able to condense the second light beam 52 of the second wavelength on the DVD as the second optical disc 62 having a second substrate thickness 62a and the third light beam 53 of the third wavelength on the CD as the third optical disc having a third substrate thickness 63a.

The numerical aperture of the objective lens 14 is 0.85, 0.60 and 0.45 for the first, second and third wavelengths, respectively. Meanwhile, the thickness of the first protective substrate of the first optical disc, as BD, is 0.1 mm, while that of the second optical disc, as DVD, is 0.6 mm and that of the third optical disc, as CD, is 1.2 mm.

The first diffractive element 15 is a blade type diffractive element of a serrated cross-section with respect to the axis of the transmitting light, and has the NA, a pitch at the outermost rim and a groove depth equal to 0.6, approximately 10 μm and approximately 0.95 μm, respectively. The groove depth of the first diffractive element 15 is set to such a value that, when the light beam 51 having the first wavelength, the light beam 52 having the second wavelength and the light beam 53 having the third wavelength, are transmitted therethrough, the transmission diffraction efficiency of an order-one diffracted light or an order-minus-one diffracted light will be higher than any of the diffracted light beams of the other orders, such as order-zero or order-two light.

The second diffractive element 16 is a stepped diffractive element, having a stepped cross-section with respect to the axis of the transmitting light, and has the NA, the pitch at the outermost rim and a groove depth equal to 0.6, approximately 90 μm and approximately 6.08 μm, respectively. The groove depth of the second diffractive element 16 is set to such a value that, when the light beam 51 for BD, having the shortest wavelength (405 nm), and the light beam 52 for DVD, having the longest wavelength (785 nm), out of the light beam 51 having the first wavelength, the light beam 52 having the second wavelength and the light beam 53 having the third wavelength, are transmitted therethrough, the transmission diffraction efficiency of the order zero diffracted light is higher than any of the diffracted light beams of the other orders, while the transmission diffraction efficiency of the an order 1 diffracted light or the order −1 diffracted light, when the light beam 52 for DVD is transmitted therethrough, will be higher than any of the diffracted light beams of the other orders.

Figure 3:
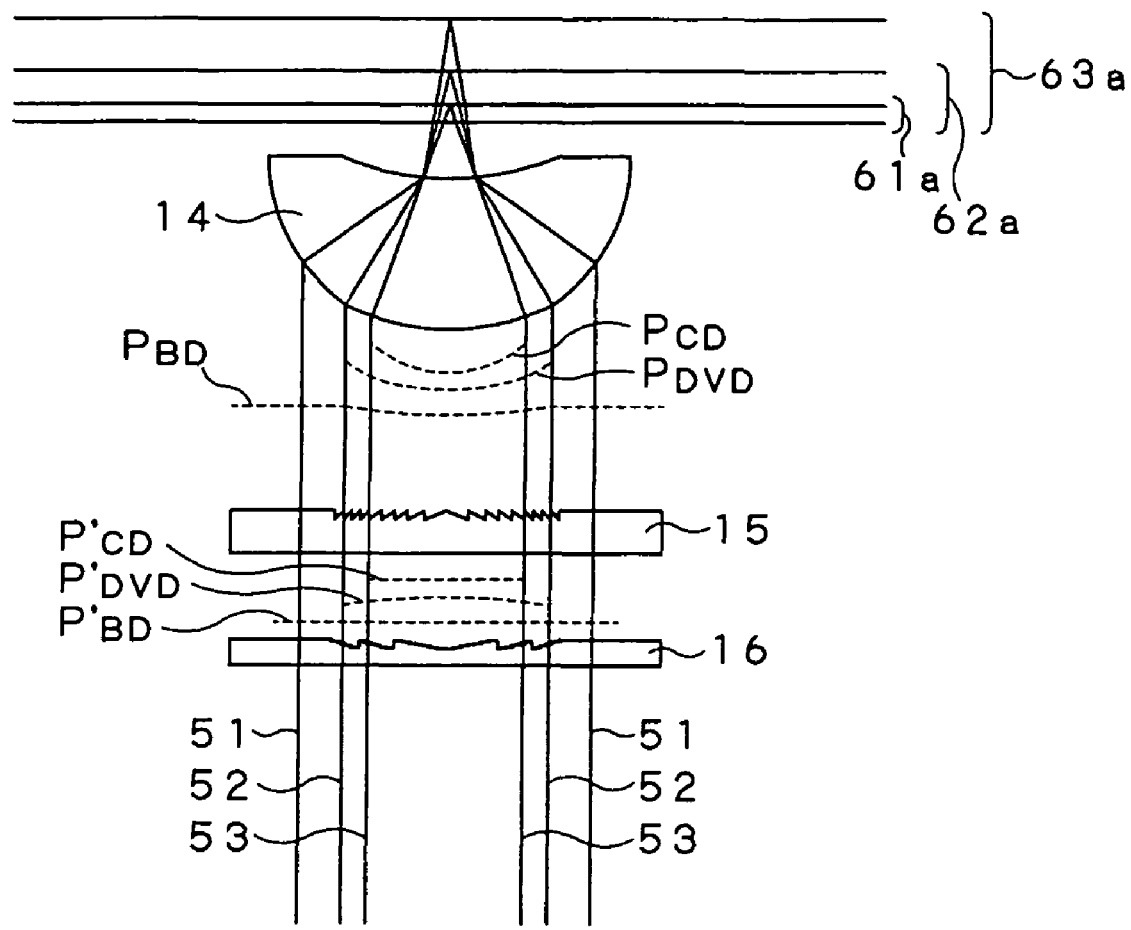
FIG. 3 is an enlarged view for illustrating a recording surface of an optical system of the optical pickup of the first embodiment, and a neighboring part thereof.

In FIG. 3, the respective light beams are plotted as a straight line. However, the wavefront of the order-one diffracted light of the light beam for BD, generated by the first diffractive element 15, is shown by a broken line $P_{BD}$, while that of the order-one diffracted light of the light beam for DVD and that of the order-one diffracted light of the light beam for CD are shown by broken lines $P_{DVD}$ and $P_{CD}$, respectively. On the other hand, the wavefront of the order-one diffracted light of the light beam for DVD, generated by the second diffractive element 16, is shown by a broken line P'$_{DVD}$, while the wavefront of the order-zero diffracted light, when the light beam for BD 51 is transmitted, and that of the order-zero diffracted light, when the light beam for CD 53 is transmitted, are shown by broken lines P'$_{BD}$ and P'$_{CD}$, respectively.

Under the aforementioned conditions of the first and second diffractive elements 15 and 16, in the present first embodiment, the transmission diffraction efficiency of the order-one diffracted light of the light beam 51 with the wavelength of 405 nm, for the first diffractive element 15, is 84%, while that of the order-one diffracted light of the light beam 52, with the wavelength of 655 nm, is 81% and that of the order-one diffracted light of the light beam 53, with the wavelength of 785 nm, is 60%. On the other hand, the transmission diffraction efficiency of the order-zero diffracted light of the light beam 51, with the wavelength of 405 nm, for the second diffractive element 16, is 77%, that of the order-one diffracted light of the light beam 52 with the wavelength of 655 nm is 78%, and that of the order-one diffracted light of the light beam 53 with the wavelength of 785 nm is 85%.

Meanwhile, the optical system is such a one where collimated light is incident on the imaging unit 17 made up by the first and second diffractive elements 15 and 16.

The optical axes of the light beams 52, 53 for DVD and CD, radiated from the second basic optical system 12 for DVD and CD, are brought into coincidence with the optical axis of the light beam 51, radiated from the first basic optical system 11 for BD, by a wavelength-selective optical axis combining prism 18. The light beams, having the optical axes confounded, are collimated by a collimator lens 13 to fall on the second diffractive element 16 of the imaging unit 17. The light beam 51, with the wavelength of 405 nm, the light beam 52, with the wavelength of 665 nm and the light beam 53, with the wavelength of 785 nm, are corrected as to spherical aberration by the second diffractive element 16 and by the first diffractive element 15, such that the transmission diffraction efficiency is not lowered but optimized.

Figure 4:
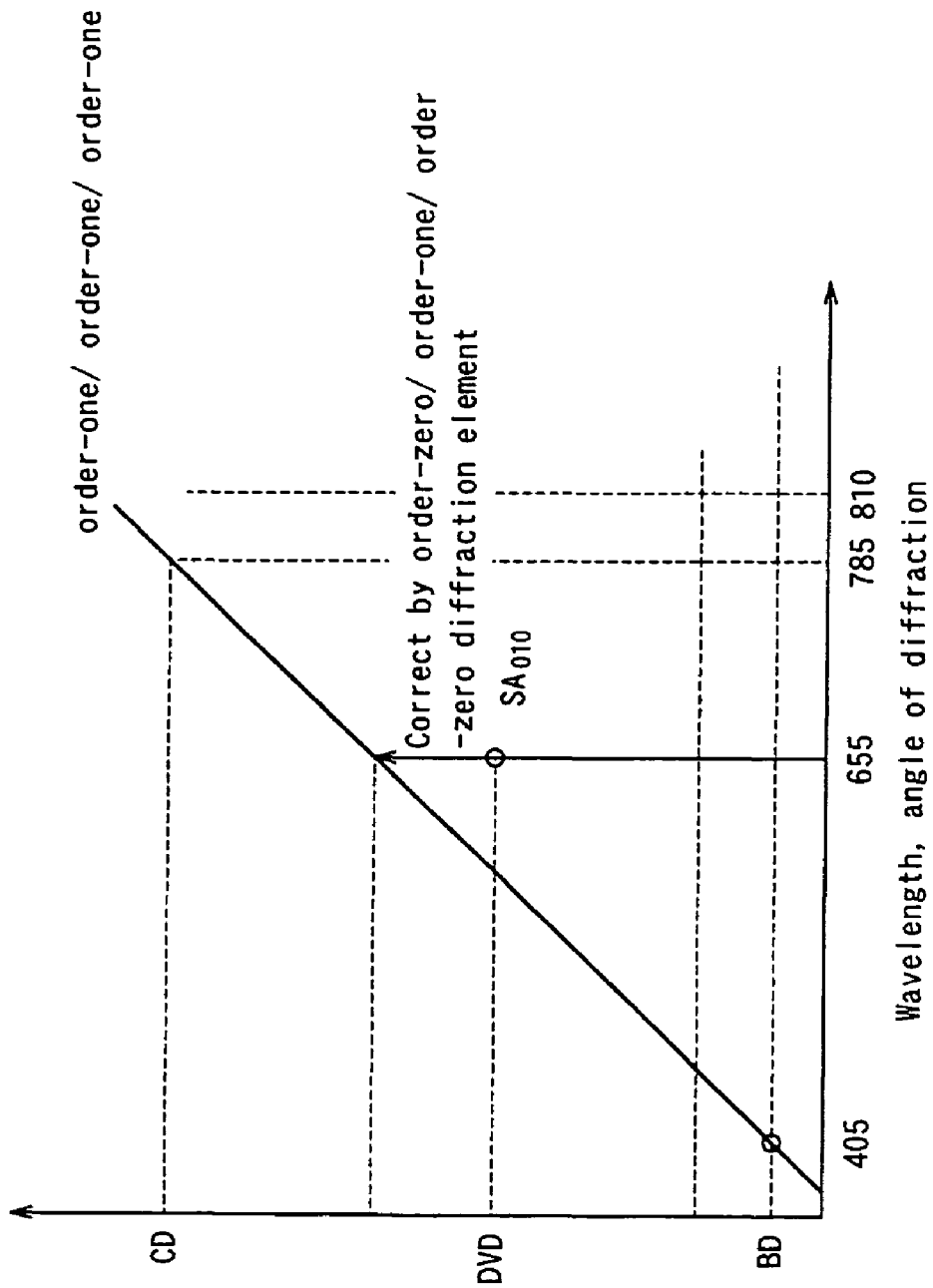
FIG. 4 is a graph illustrating the thickness of a protective substrate protecting a recording surface of the optical disc, a working wavelength band and the quantity of the spherical aberration generated.

FIG. 4 schematically shows a case of employing the optical system of the optical pickup 1. The ordinate and the abscissa in FIG. 4 denote the thickness of the protective substrate for protecting the recording surface of the optical discs and the wavelength bands of the light beams used, respectively. The amount of the spherical aberration produced is proportional to the thickness of the protective substrate, and the angle of diffraction is proportionate to the wavelength. Consequently, FIG. 4 also shows the relationship between the quantity of the spherical aberration and the angle of diffraction for this wavelength. Referring to FIG. 4, the optical pickup 1 compensates, by the second diffractive element 16, the residual spherical aberration SA$_{010}$ appearing in case the order-one diffracted light of the DVD is caused to fall on the objective lens in a system employing the first diffractive element 15 optimized to generate the order-one diffracted light for BD, DVD and CD.

By setting the above conditions for the first and second diffractive elements 15 and 16, making up the imaging unit 17, it is possible to achieve optical characteristics, in which the spherical aberration for the three wavelengths is corrected, as high transmission diffraction efficiency for the respective light beams is maintained.

Figure 2:
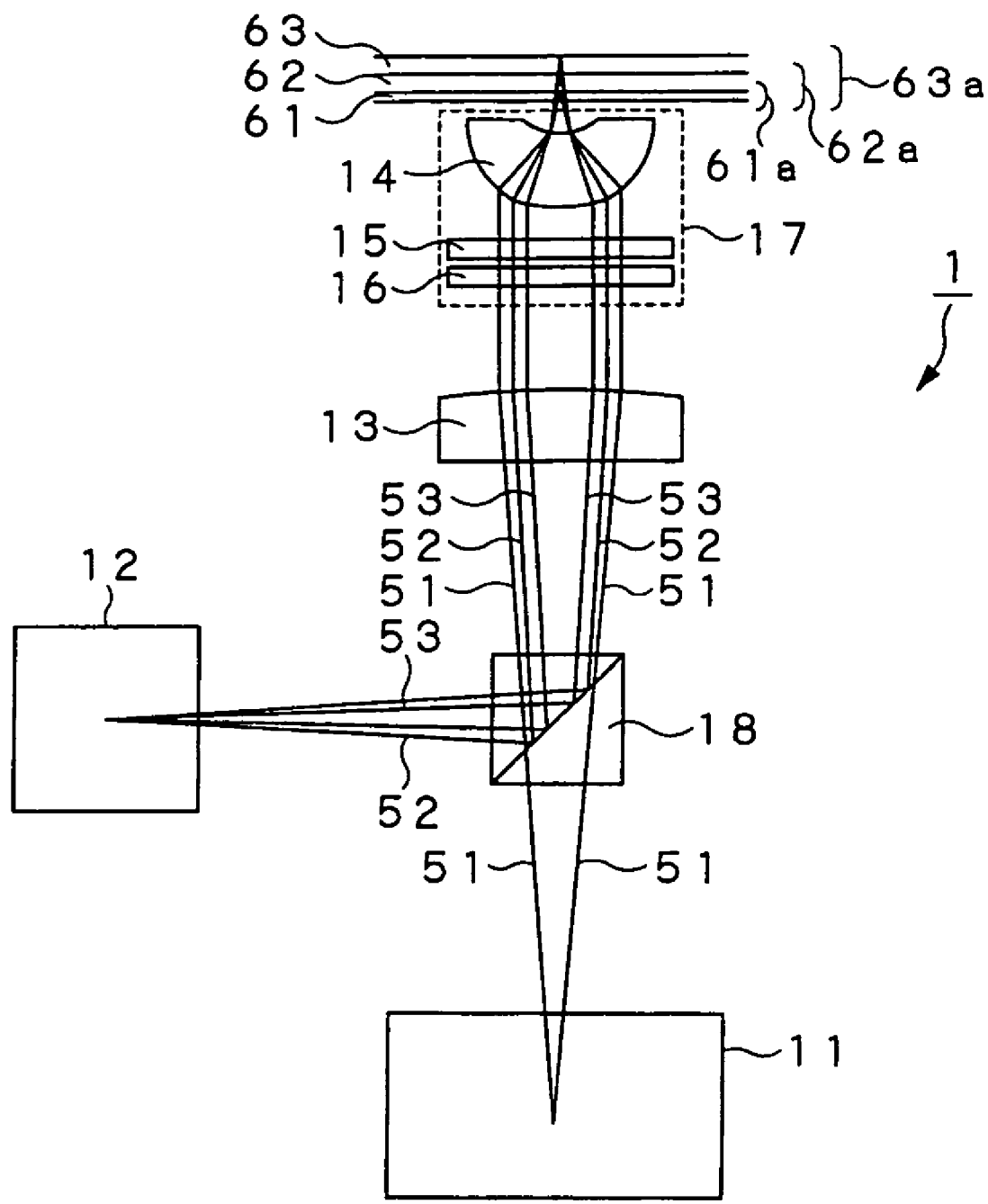
FIG. 2 schematically shows the structure of an optical pickup shown as a first embodiment of the present invention.
Figure 5:
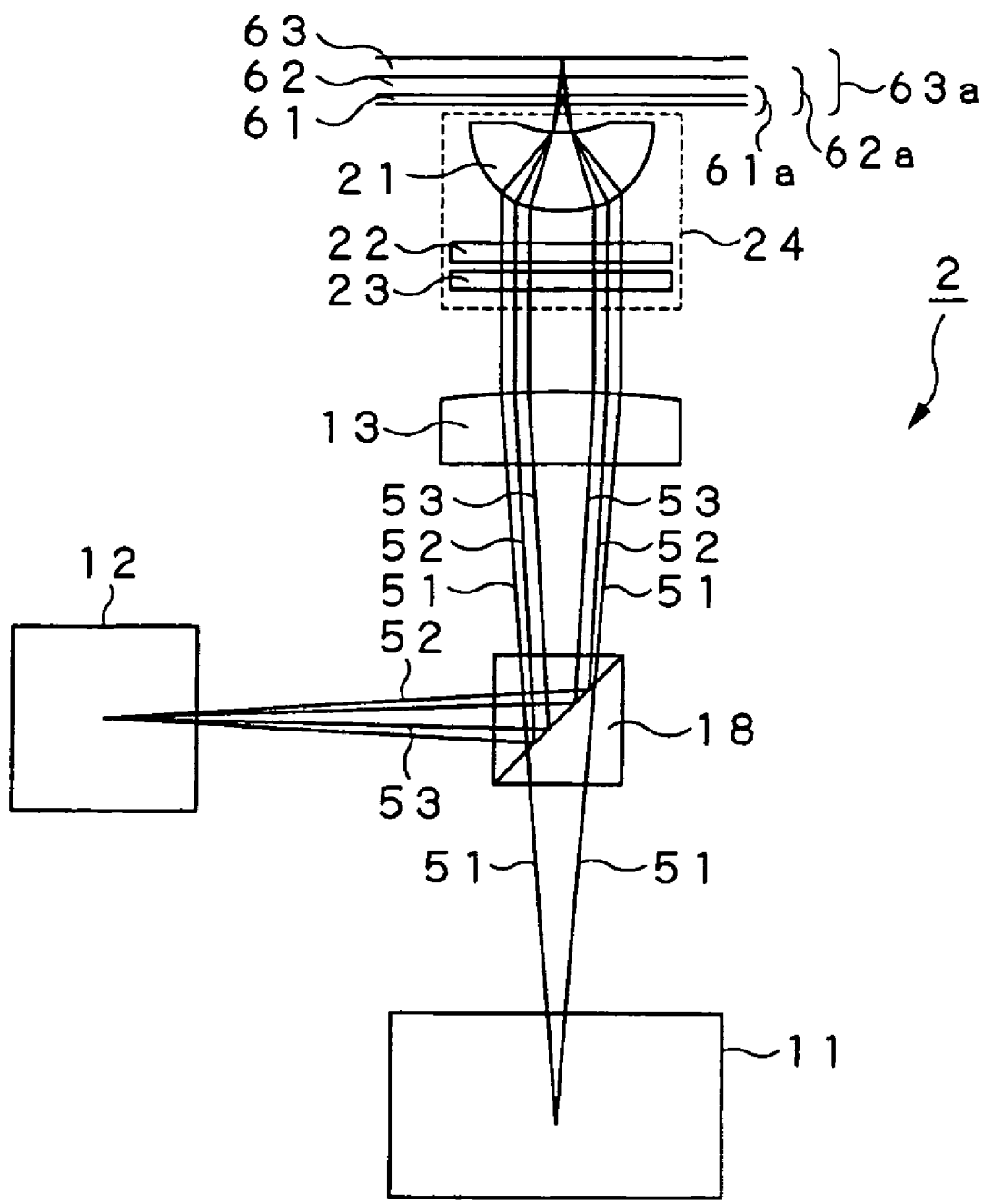
FIG. 5 schematically shows the structure of an optical pickup shown as a second embodiment of the present invention.
Figure 6:
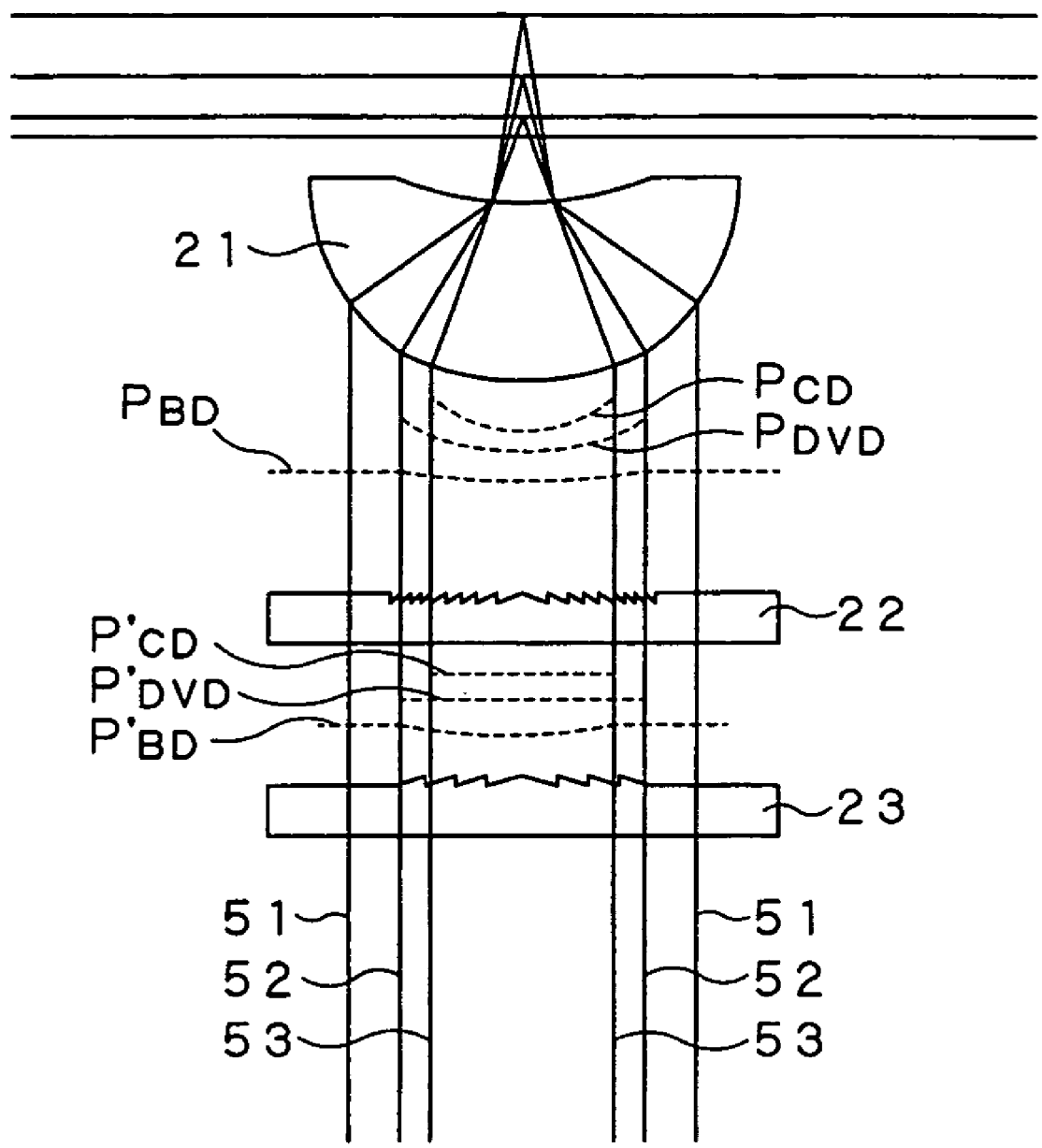
FIG. 6 is an enlarged view for illustrating a recording surface of an optical system of the optical pickup of the second embodiment, and a neighboring part thereof.

An optical system of an optical pickup according to a second specified embodiment of the present invention will now be explained with reference to FIGS. 5 and 6. FIG. 6 shows a recording surface of the optical disc, an objective lens and a diffraction element to an enlarged scale. The second specified embodiment is directed to a case where the diffractive elements of a set, making up the imaging unit, are both blade type diffractive elements. In FIGS. 5 and 6, parts or elements which are the same as those of FIGS. 2 and 3 are denoted by the same reference numerals and detailed explanation is omitted for simplicity.

The optical pickup 2 includes a basic optical system, composed e.g. of a light source, a photodetector for receiving the light reflected back from the recording surface to read out light signals, a spectroscopic element for branching the radiated light and the return light from each other, and a device for generating focusing or tracking signals, an objective lens 21 for condensing a light beam radiated from the light source onto the recording surface of the optical disc, and a set of diffractive elements 22, 23 arranged directly forward of the objective lens 21. In the optical pickup 1, the objective lens 21 and the set of the diffractive elements 22, 23 are fixed relative to each other as an imaging unit 24 and is driven by a sole actuator.

In the present second embodiment, as in the previous embodiment, the first optical disc 61 is a Blue-Ray disc (BD) employing the light beam 51, with a wavelength of 405 nm, as a recording and/or reproducing light beam, whilst the second optical disc 62 is a DVD (Digital Versatile Disc) employing the light beam 52, with a wavelength of 655 nm, as a recording and/or reproducing light beam, and the third optical disc 63 is a Compact Disc (CD) employing the light beam 53, with a wavelength of 785 nm, as a recording and/or reproducing light beam.

The objective lens 21 is able to condense the light beam 51, with a first wavelength, to the BD as the first optical disc 61 having the first protective substrate thickness 61a, as well as to condense the light beam 52, with a second wavelength, to the DVD as the second optical disc 62 having the second protective substrate thickness 62a, and to condense the light beam 53, with a third wavelength, to the CD as the third optical disc 63 having the third protective substrate thickness 63a.

The first diffractive element 22 is a blade type diffractive element, the cross-section of which relative to the axis of light transmitted therethrough is in a serrated shape, with the NA, the pitch at the outermost rim and the groove depth being 0.6, approximately 8 μm and approximately 0.95 μm, respectively. The groove depth of the first diffractive element 22 is such that the transmission diffraction efficiency of the order-one diffracted light or that of the order-minus-one diffracted light when the light beam 51 having the first wavelength, the light beam 52 having the second wavelength and the light beam 53 having the third wavelength are transmitted therethrough will be higher than that of any of the diffracted light beams of the other orders, such as order-zero or order-two light beams.

The second diffractive element 23 is also a blade type diffractive element of a serrated cross-section with respect to the axis of the transmitting light, having the NA, the pitch at the outermost rim and a groove depth of 0.6, approximately 23 μm and approximately 0.55 μm, respectively. The groove depth of the second diffractive element 23 is set to such a value that, when the light beam 51 for BD having the shortest wavelength (405 nm), out of the light beam 51 having the first wavelength, the light beam 52 having the second wavelength and the light beam 53 having the third wavelength, is transmitted therethrough, the transmission diffraction efficiency of the order-one diffracted light and that of the order-minus-one light will be higher than any of the diffracted light beams of the other orders, while the transmission diffraction efficiency of the an order-zero diffracted light when the remaining light beams are transmitted therethrough, will be higher than any of the diffracted light beams of the other orders.

In FIG. 6, the respective light beams are plotted as a straight line. However, the wavefront of the order-one diffracted light of the light beam for BD, generated by the first diffractive element 22, is shown by a broken line $P_{BD}$, while that of the order-one diffracted light of the light beam for DVD and that of the order-one diffracted light of the light beam for CD are shown by broken lines $P_{DVD}$ and $P_{CD}$, respectively. On the other hand, the wavefront of the order-one diffracted light of the light beam for BD, generated by the second diffractive element 23, is shown by an upwardly curved broken line $P'_{BD}$, while the wavefront of the order-zero diffracted light, when the light beam for DVD 51 and the light beam for CD 52 are transmitted therethrough, are shown by broken lines $P'_{DVD}$ and $P'_{CD}$, respectively.

Under the aforementioned conditions of the first and second diffractive elements 22 and 23, in the present second embodiment, the transmission diffraction efficiency of the order-one diffracted light of the light beam 51 with the wavelength of 405 nm, for the first diffractive element 22, is 84%, while that of the order-one diffracted light of the light beam 52 with the wavelength of 655 nm, is 81%, and that of the order-one diffracted light of the light beam 53, with the wavelength of 785 nm, is 60%. On the other hand, the transmission diffraction efficiency of the order zero diffracted light of the light beam 51 with the wavelength of 405 nm for the second diffractive element 23 is 75%, that of the order-one diffracted light of the light beam 52 with the wavelength of 655 nm is 52% and that of the order-one diffracted light of the light beam 53 with the wavelength of 785 nm is 64%.

As in the first specified embodiment, the optical system is such a one where collimated light is incident on the imaging unit 17 made up by the first and second diffractive elements 15 and 16.

The optical axes of the light beams 52, 53 for DVD and CD, radiated from the second basic optical system 12, are brought into coincidence with the optical axis of the light beam 51, radiated from the first basic optical system 11 for BD, by the wavelength-selective optical axis combining prism 18. The light beams, having coincident optical axes, are collimated by the collimator lens 13 to fall on the second diffractive element 23 of the imaging unit 24. The light beam 51, with the wavelength of 405 nm, the light beam 52, with the wavelength of 665 nm and the light beam 53, with the wavelength of 785 nm, are corrected as to spherical aberration by the second diffractive element 23 and by the first diffractive element 22 such that the transmission diffraction efficiency is not lowered but optimized.

Figure 7:
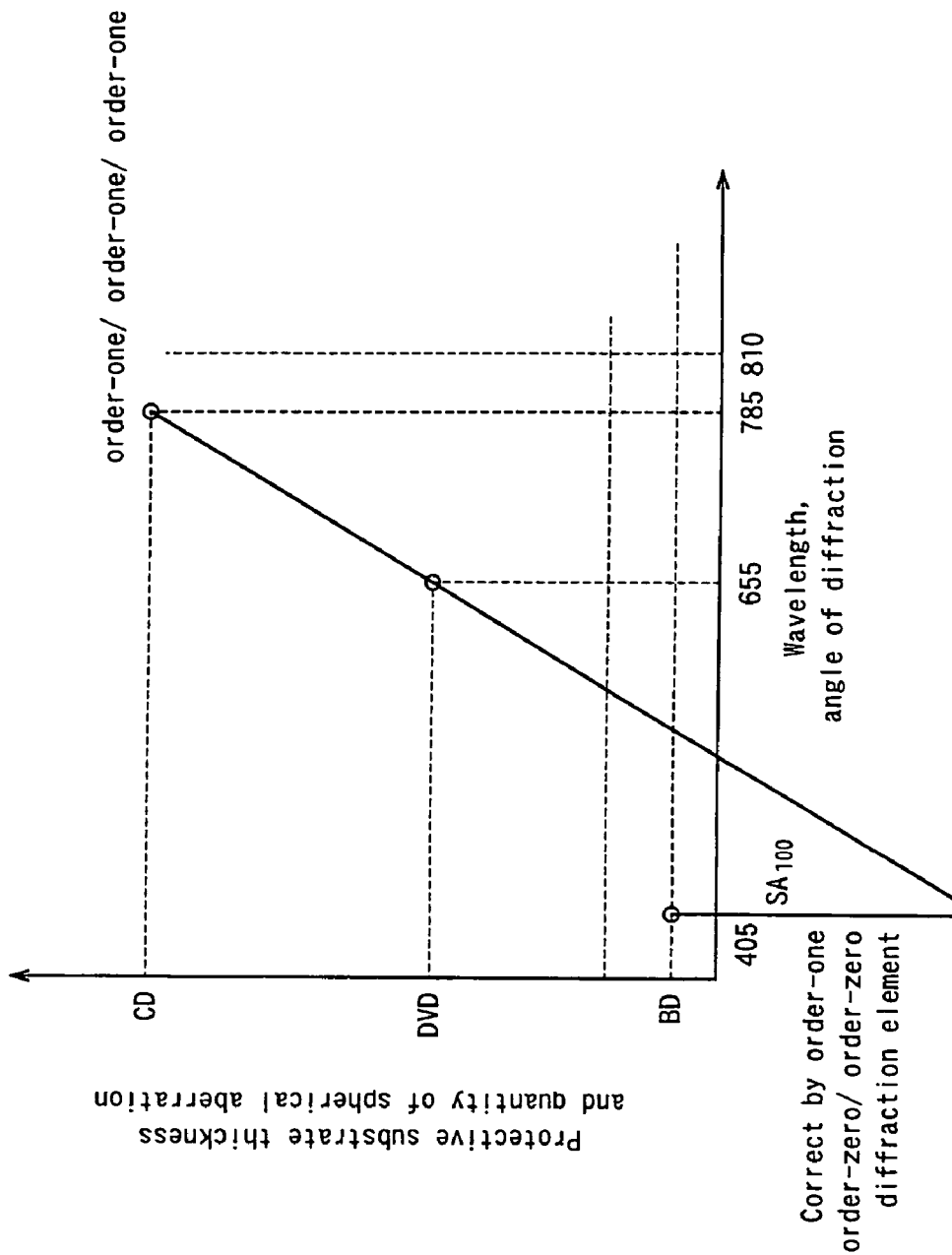
FIG. 7 is a graph illustrating the thickness of a protective substrate protecting a recording surface of the optical disc, a working wavelength band and the quantity of the spherical aberration generated.

FIG. 7 schematically shows a case of employing the optical system of the optical pickup 2. The ordinate and the abscissa in FIG. 7 denote the thickness of the protective substrate for protecting the recording surface of the optical discs and the wavelength bands of the light beams used, respectively. The amount of the spherical aberration produced is proportional to the thickness of the protective substrate, and the angle of diffraction is proportionate to the wavelength. Consequently, FIG. 4 also shows the relationship between the quantity of the spherical aberration and the angle of diffraction for this wavelength. Referring to FIG. 7, the optical pickup 2 compensates, by the second diffractive element 23, the residual spherical aberration $SA_{100}$ appearing in case the order-one diffracted light of the BD is caused to fall on the objective lens in a system employing the first diffractive element 22 optimized to generate the order-one diffracted light beam for BD, DVD and CD.

By setting the above conditions for the first and second diffractive elements 22 and 23, making up the imaging unit 24, the optical characteristics, achieving the correction of the spherical aberration for the three wavelengths, may be realized, as high transmission diffraction efficiency for the respective light beams is maintained.

Embodiment in which a set of diffraction means are provided on both surfaces of a sole optical plate.

Figure 8:
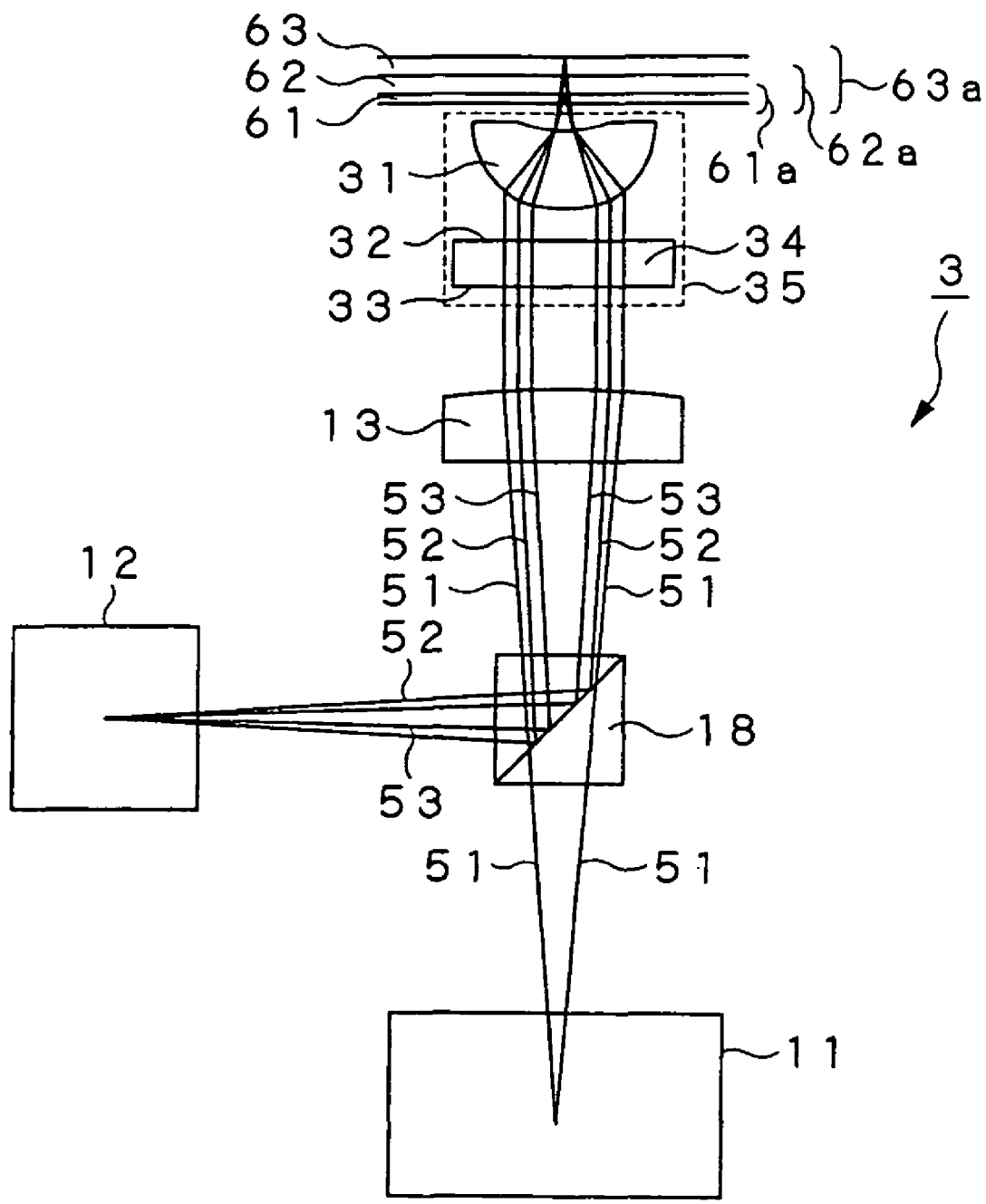
FIG. 8 schematically shows the structure of an optical pickup shown as a third embodiment of the present invention.
Figure 9:
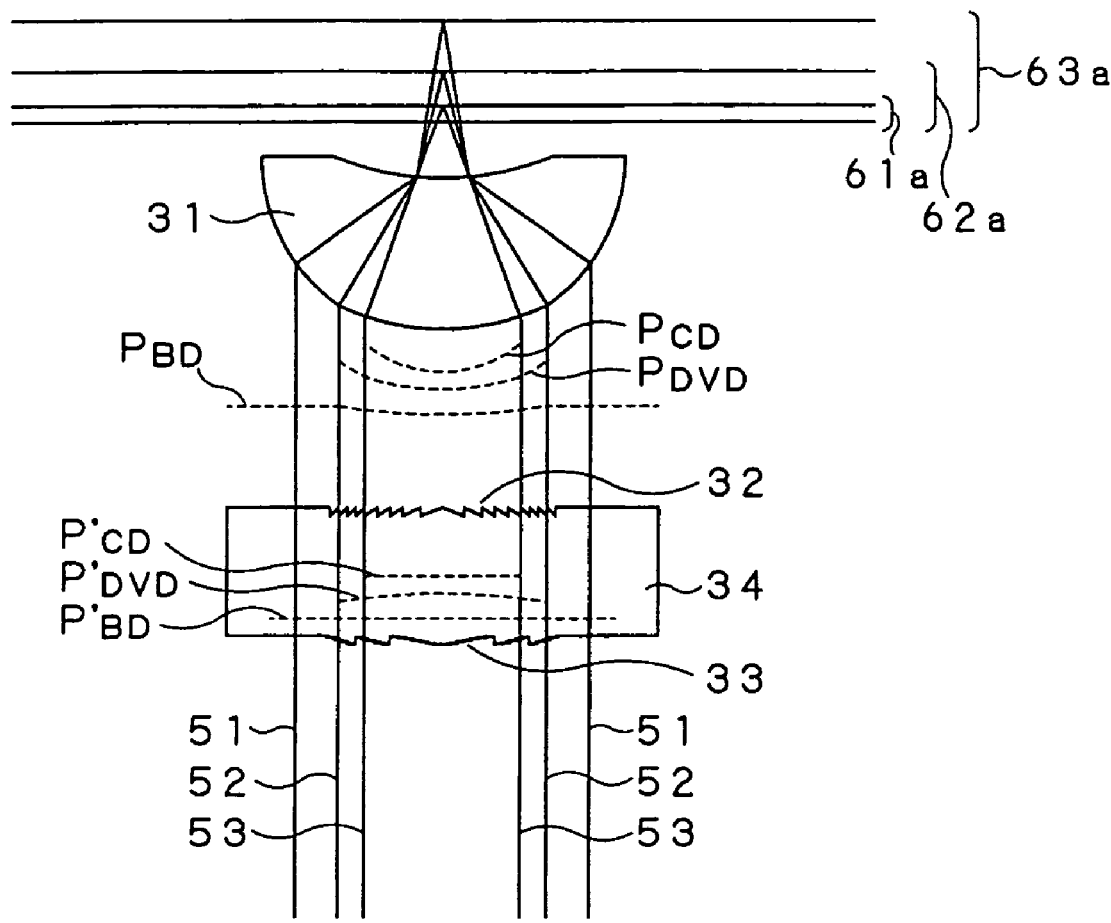
FIG. 9 is an enlarged view for illustrating a recording surface of an optical system of the optical pickup of the third embodiment, and a neighboring part thereof, in case one of the diffractive elements of the optical pickup is a blade type diffractive element and the other is the step type diffractive element.

Referring to FIGS. 8 and 9, an optical system of an optical pickup, shown as a third specified embodiment of the present invention, will be explained. In FIG. 9, the recording surface of the optical disc, objective lens and the diffractive element are shown to an enlarged scale. In the specified embodiment, shown in FIGS. 8 and 9, the same parts or components as those shown in FIGS. 2 and 3 are depicted by the same reference numerals and are not explained specifically.

The optical pickup 1 is made up by a basic optical system, including a light source, a photodetector receiving the reflected light beam from a recording surface to read out light signals, a spectroscopic element for branching a radiated light beam and a return light beam from each other, and devices for generating focusing signals or tracking signals, an objective lens 31 for condensing the light beam radiated from the light source to the recording surface of the optical disc, and a set of diffractive elements 32, 33, arranged directly ahead of the objective lens 31. In the optical pickup 3, the diffractive elements 32, 33 are formed on the opposite sides of the optical plate 34. This optical plate 34 and the objective lens 31 are fixed relative to each other to form an imaging unit 35, which imaging unit is driven by a sole actuator.

In the present third embodiment, as in the previous embodiment, the first optical disc 61 is the Blue-Ray disc (BD) employing the light beam 51 with the wavelength of 405 nm as recording and/or reproducing light, while the second optical disc 62 is the DVD (Digital Versatile Disc) employing the light beam 52 with the wavelength of 655 nm as recording and/or reproducing light and the third optical disc 63 is the CD (Compact Disc) employing the light beam 53 with the wavelength of 785 nm as recording and/or reproducing light.

The objective lens 31 is able to condense the light beam 51, with a first wavelength, to the BD as the first optical disc 61 having the first protective substrate thickness 61a, as well as to condense the light beam 52, with a second wavelength, to the DVD as the second optical disc 62 having the second protective substrate thickness 62a, and to condense the light beam 53, with a third wavelength, to the CD as the third optical disc 63 having the third protective substrate thickness 63a.

The first diffractive element 32 is a blade type diffractive element, the cross-section of which relative to the axis of light transmitted therethrough is in a serrated shape, with the NA, the pitch at the outermost rim and the groove depth being 0.6, approximately 10 μm and approximately 0.95 μm, respectively. The groove depth of the first diffractive element 16 is such that the transmission diffraction efficiency of the order-one diffracted light or that of the order-minus-one diffracted light, when the light beam 51 having the first wavelength, the light beam 52 having the second wavelength and the light beam 53 having the third wavelength are transmitted therethrough, will be higher than that of any of the diffracted light beams of the other orders, such as order-zero or order-two light beams.

The second diffractive element 33 is a stepped diffractive element of a stepped cross-section with respect to the axis of the transmitting light, having the NA, with the pitch at the outermost rim and a groove depth being 0.6, approximately 90 μm and approximately 6.08 μm, respectively. The groove depth of the second diffractive element 16 is set to such a value that, when the light beam 51 for BD having the shortest wavelength (405 nm), and the light beam 53 for CD, having the longest wavelength (785 nm), out of the light beam 51 having the first wavelength, the light beam 52 having the second wavelength and the light beam 53 having the third wavelength, are transmitted therethrough, the transmission diffraction efficiency of the order-zero diffracted light is higher than any of the diffracted light beams of the other orders, while the transmission diffraction efficiency of the an order-one diffracted light or the order-minus-one diffracted light when the light beam 52 for DVD is transmitted will be higher than any of the diffracted light beams of the other orders.

In FIG. 9, the respective light beams are plotted as straight lines. However, the wavefront of the order-one diffracted light of the light beam for BD, generated by the first diffractive element 32, is shown by a broken line $P_{BD}$, while that of the order-one diffracted light of the light beam for DVD and that of the order-one diffracted light of the light beam for CD are shown by broken lines $P_{DVD}$ and $P_{CD}$, respectively. On the other hand, the wavefront of the order-one diffracted light of the light beam for DVD, generated by the second diffractive element 33, is shown by a broken line $P'_{DVD}$, while the wavefront of the order-zero diffracted light, when the light beam for BD 51 and the light beam for CD 53 are transmitted therethrough, are shown by broken lines $P'_{BD}$ and $P'_{CD}$, respectively.

Figure 10:
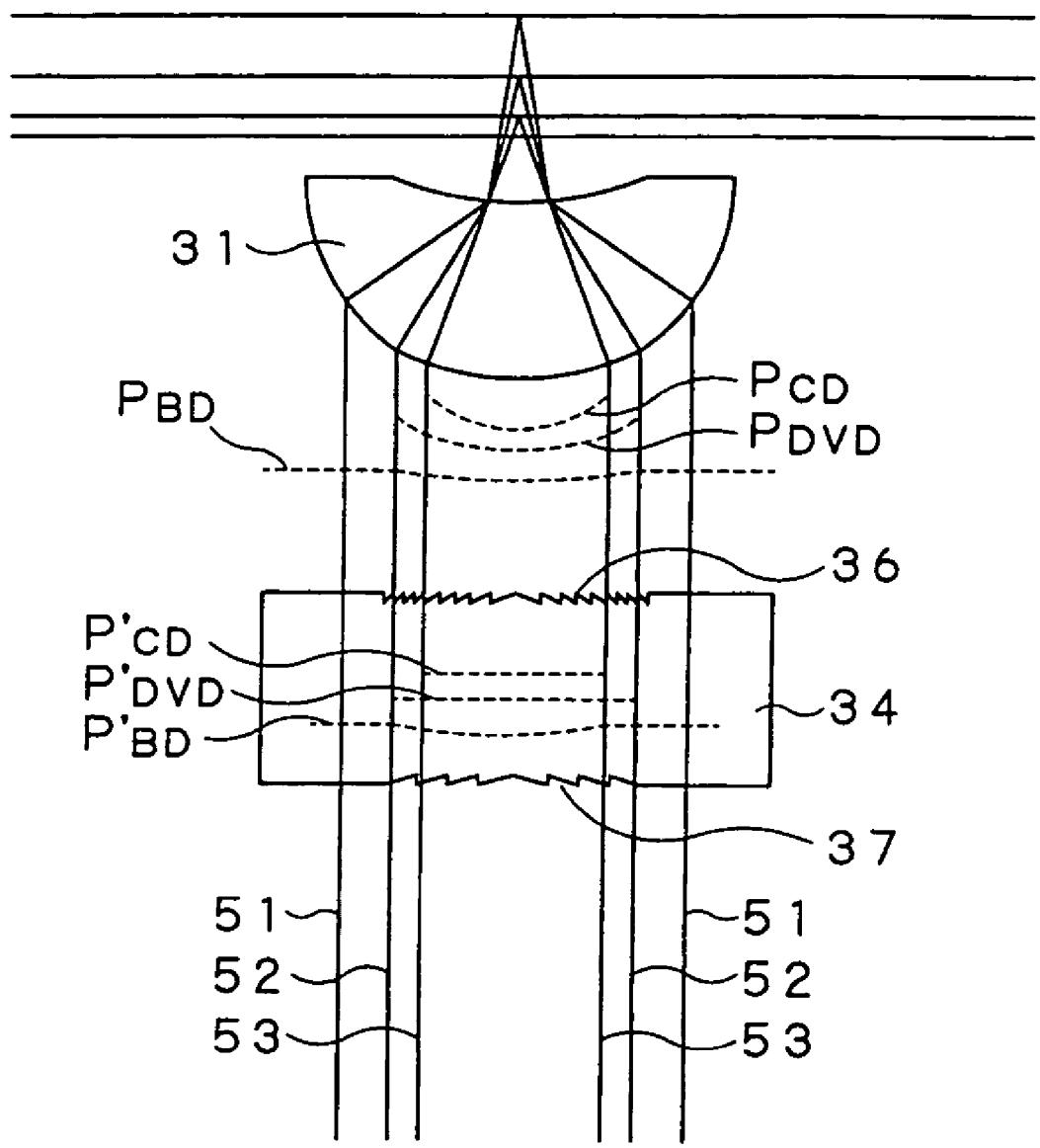
FIG. 10 is an enlarged view for illustrating a recording surface of an optical system of the optical pickup of the third embodiment, and a neighboring part thereof, in case both of the diffractive elements are blade type diffractive elements.

The diffractive elements of the set may also be blade type diffractive elements. An example for such case is shown in FIG. 10. The third diffractive element 36 is a blade type diffractive element of a serrated cross-section with respect to the optical axis of the transmitting light, with the NA, the pitch at the outermost rim and a groove depth being 0.6, approximately 8 µm and approximately 0.95 µm, respectively. The groove depth of the third diffractive element 36 is set to such a value that, when the light beam 51 having the first wavelength, the light beam 52 having the second wavelength and the light beam 53 having the third wavelength are transmitted therethrough, the transmission diffraction efficiency of an order-one diffracted light or an order-minus-one diffracted light will be higher than any of the diffracted light beams of the other orders, such as order 0 or order 2 light.

The fourth diffractive element 37 is also a blade type diffractive element of a serrated cross-section with respect to the axis of the transmitting light, having the NA, the pitch at the outermost rim and a groove depth of 0.6, approximately 23 µm and approximately 0.55 µm, respectively. The groove depth of the second diffractive element 37 is set to such a value that, when the light beam 51 for BD having the shortest wavelength (405 nm), out of the light beam 51 having the first wavelength, the light beam 52 having the second wavelength and the light beam 53 having the third wavelength, is transmitted therethrough, the transmission diffraction efficiency of the order-one diffracted light and that of the order-minus-one light will be higher than any of the diffracted light beams of the other orders, whereas the transmission diffraction efficiency of the an order-zero diffracted light when the other light beams are transmitted through the fourth diffractive element will be higher than any of the diffracted light beams of the other orders.

In FIG. 10, the wavefront of the order-one diffracted light of the light beam for BD, generated by the third diffractive element 36, is shown by a broken line $P_{BD}$, while that of the order-one diffracted light of the light beam for DVD and that of the order-one diffracted light of the light beam for CD are shown by broken lines $P_{DVD}$ and $P_{CD}$, respectively. On the other hand, the wavefront of the order-one diffracted light of the light beam for BD, generated by the fourth diffractive element 37, is shown by a broken line $P'_{BD}$, while the wavefront of the order-zero diffracted light, when the light beam for DVD 51 and the light beam for CD 52 are transmitted therethrough, are shown by broken lines $P'_{DVD}$ and $P'_{CD}$, respectively.

As in the first specified embodiment, the optical system is such a one where collimated light is incident on the imaging unit 35, made up by the objective lens 31, first diffractive element 32, second diffractive element 33 and optical plate 34, or on the imaging unit 35, made up by the objective lens 31, third diffractive element 31, fourth diffractive element 37 and the optical plate 34.

Embodiment in which one of diffractive gratings of a set is mounted to the objective lens and the other is mounted to the optical plate.

Figure 11:
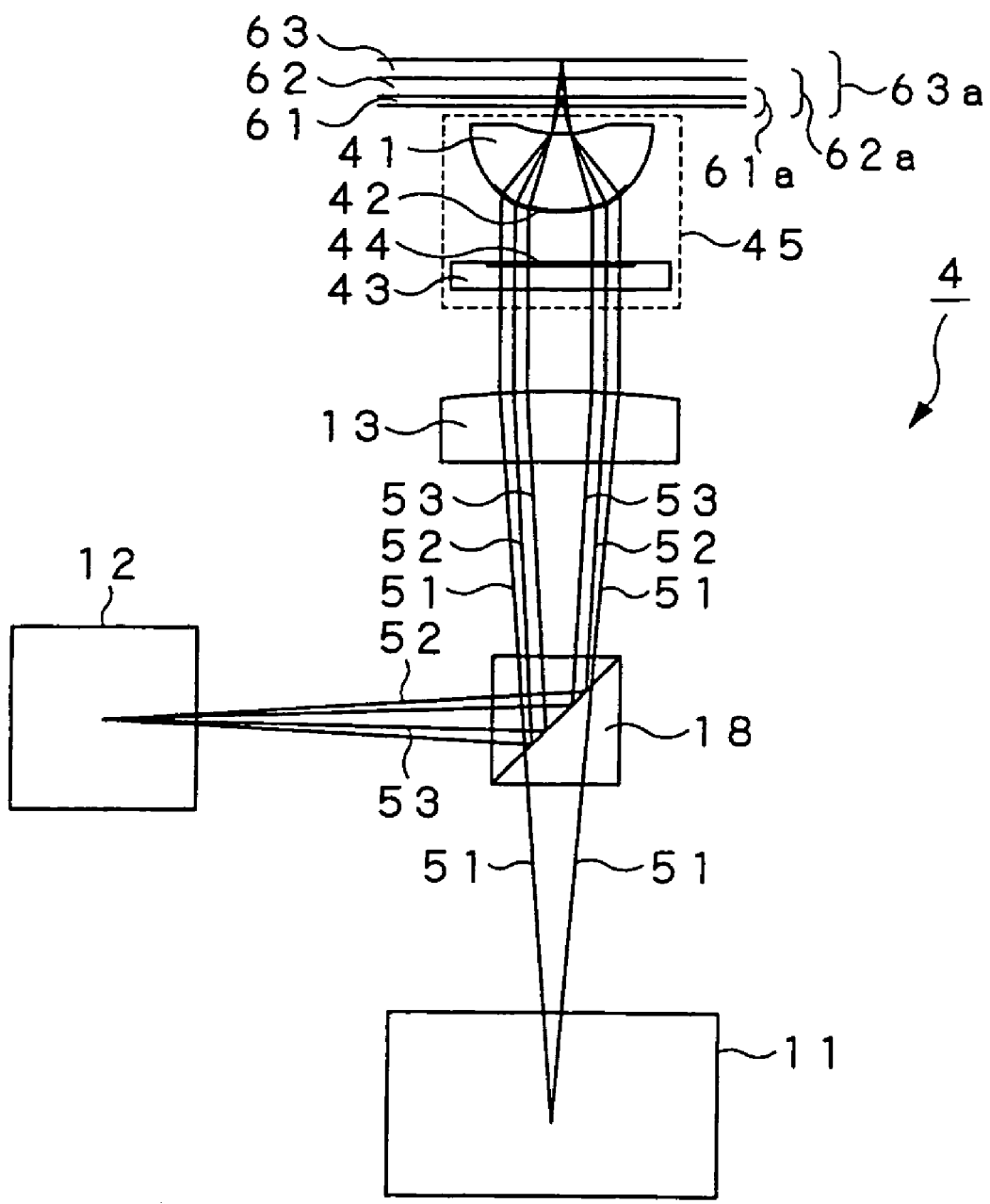
FIG. 11 schematically shows the structure of an optical pickup shown as a fourth embodiment of the present invention.
Figure 12:
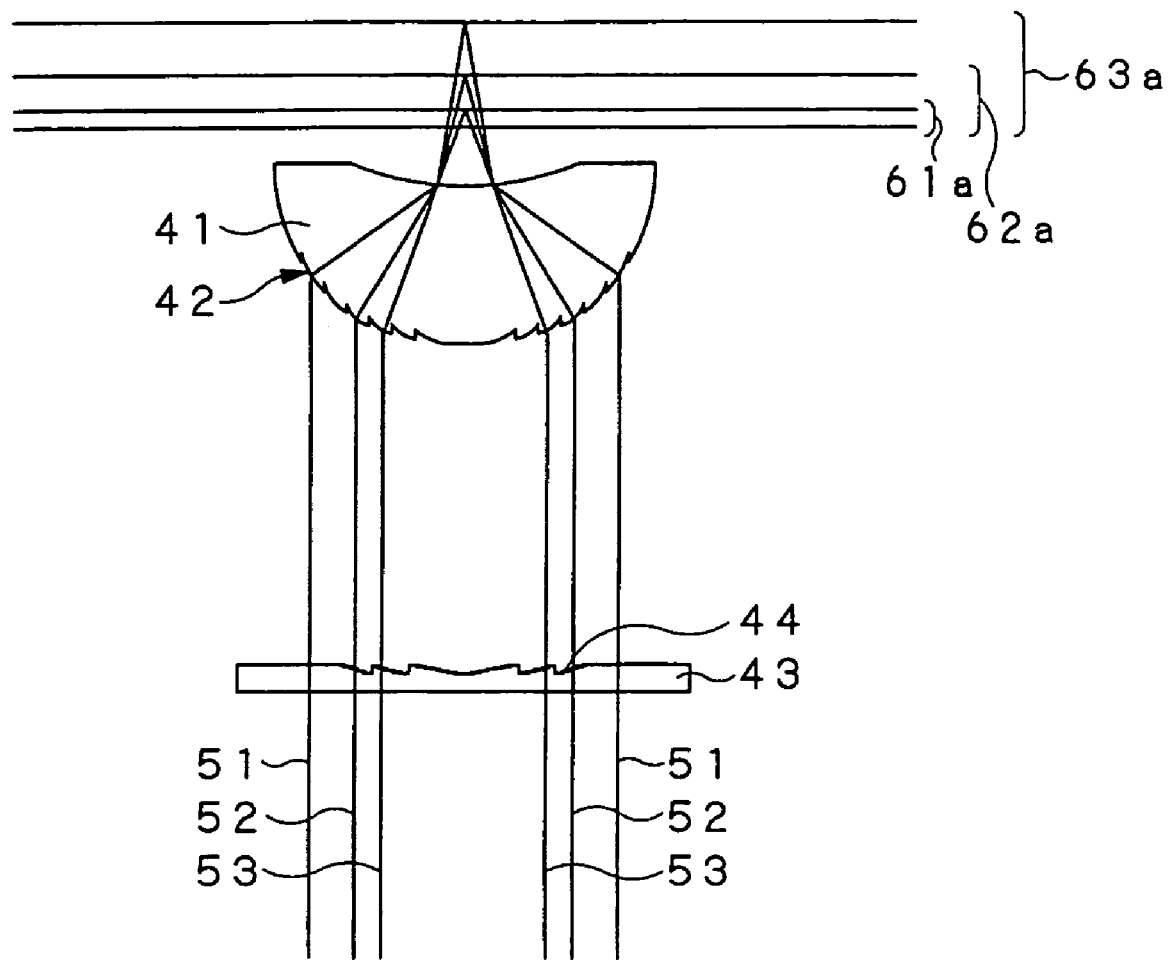
FIG. 12 is an enlarged view for illustrating a recording surface of an optical system of the optical pickup of the fourth embodiment, and a neighboring part thereof, in case one of the diffractive elements of the optical pickup is a blade type diffractive element and the other is the step type diffractive element.

Referring to FIGS. 11 and 12, an optical system of an optical pickup, shown as a fourth specified embodiment of the present invention, will be explained. In FIG. 12, the recording surface of the optical disc, objective lens and the diffractive element are shown to an enlarged scale. In the present fourth embodiment, one of the diffractive elements of the set is mounted to the objective lens, and the other is mounted to the optical plate. In the specified fourth embodiment, shown in FIGS. 8 and 9, the parts or components which are the same in operation as those shown in FIGS. 2 and 3 are depicted by the same reference numerals and are not explained specifically.

An optical pickup 4 is made up by a basic optical system, including a light source, a photodetector receiving the reflected light beam on a recording surface to read out light signals, a spectroscopic element for branching an outgoing light beam and a return light beam from each other, and devices for generating focusing signals or tracking signals, an objective lens 41 for condensing the light beam radiated from the light source to the recording surface of the optical disc, a first diffractive element 42 arranged on this objective lens 41, and a second diffractive element 44 arranged on an optical plate 43 secured to the objective lens 41 and the first diffractive element 42. In the optical pickup 4, the objective lens 41, the first diffractive element 42 formed on the objective lens 41 and the second diffractive element 44 arranged on an optical plate 43 are fixed relative to one another as an imaging unit 45, which imaging unit is driven by a sole actuator.

In the present fourth embodiment, as in the previous embodiments, the first optical disc 61 is the Blue-Ray disc (BD) employing the light beam 51 with the wavelength of 405 nm as recording and/or reproducing light, while the second optical disc 62 is the DVD (Digital Versatile Disc) employing the light beam 52 with the wavelength of 655 nm as recording and/or reproducing light and the third optical disc 63 is the CD (Compact Disc) employing the light beam 53 with the wavelength of 785 nm as recording and/or reproducing light.

The objective lens 41 is able to condense the light beam 51, with a first wavelength, to the BD as the first optical disc 61 having the first protective substrate thickness 61a, while being able to condense the light beam 52, with a second wavelength, to the DVD as the second optical disc 62 having the second protective substrate thickness 62a, and to condense the light beam 53, with a third wavelength, to the CD as the third optical disc 63 having the third protective substrate thickness 63a.

The first diffractive element 42, formed on the objective lens 41, is a blade type diffractive element, the cross-section of which relative to the axis of light transmitted therethrough is serrated, with the NA, the pitch at the outermost rim and the groove depth being 0.6, approximately 10 µm and approximately 0.95 μm, respectively. The groove depth of the first diffractive element 42 is such that, when the light beam 51 having the first wavelength, the light beam 52 having the second wavelength and the light beam 53 having the third wavelength, are transmitted therethrough, the transmission diffraction efficiency of the order-one diffracted light or the order-minus-one diffracted light is higher than any of the light beams of the other orders.

On the other hand, the second diffractive element 44, formed on the optical plate 43, is a step type diffractive element, the cross-section of which relative to the axis of light transmitted therethrough is stepped, with the with the NA, the pitch at the outermost rim and the groove depth being 0.6, approximately 90 μm and approximately 0.68 μm, respectively. The groove depth of the second diffractive element 44 is such that, when the light beam 51 for BD having the shortest wavelength (405 nm), and the light beam 53 for CD, having the longest wavelength (785 nm), out of the light beam 51 having the first wavelength, the light beam 52 having the second wavelength and the light beam 53 having the third wavelength, are transmitted therethrough, the transmission diffraction efficiency of the order zero diffracted light is higher than any of the diffracted light beams of the other orders, while the transmission diffraction efficiency of the order-one diffracted light or the order-minus-one diffracted light when the light beam 52 for DVD is transmitted will be higher than any of the diffracted light beams of the other orders.

Figure 13:
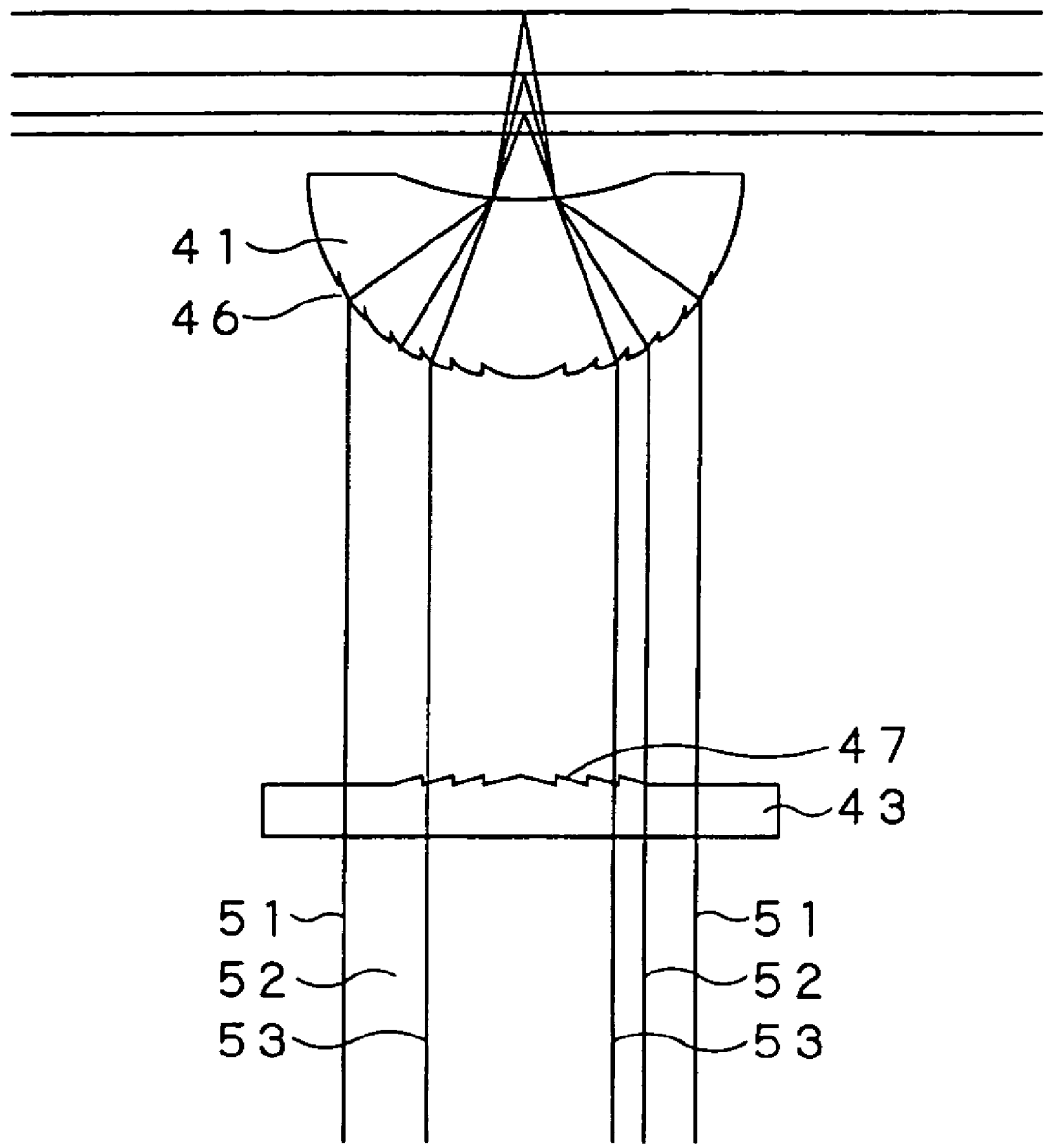
FIG. 13 is an enlarged view for illustrating a recording surface of an optical system of the optical pickup of the fourth embodiment, and a neighboring part thereof, in case both of the diffractive elements are blade type diffractive elements.

The diffraction means of the set may both be blade type diffractive elements. A case of this example is shown in FIG. 13. A third diffractive element 46, formed on the objective lens 41, is a blade type diffractive element, the cross-section of which relative to the axis of light transmitted therethrough is in a serrated shape, with the NA, the pitch at the outermost rim and the groove depth thereof being 0.6, approximately 8 μm and approximately 0.95 μm, respectively. The groove depth of the third diffractive element 46 is such that, when the light beam 51 having the first wavelength, the light beam 52 having the second wavelength and the light beam 53 having the third wavelength are transmitted therethrough, the transmission diffraction efficiency of the order-one diffracted light or that of the order-minus-one diffracted light will be higher than that of any of the diffracted light beams of the other orders, such as order-zero or order-two light beams.

The fourth diffractive element 47, formed on the optical plate 44, is again a blade type diffractive element, having a serrated cross-section with respect to the axis of the transmitting light, with the NA, the pitch at the outermost rim and a groove depth being 0.6, approximately 23 μm and approximately 0.55 μm, respectively. The groove depth of the fourth diffractive element 47 is set to such a value that, when the light beam 51 for BD having the shortest wavelength (405 nm), out of the light beam 51 having the first wavelength, the light beam 52 having the second wavelength and the light beam 53 having the third wavelength, is transmitted therethrough, the transmission diffraction efficiency of the order-one diffracted light or that of the order-minus-one light will be higher than any of the diffracted light beams of the other orders, while the transmission diffraction efficiency of the an order-zero diffracted light when the remaining light beams are transmitted will be higher than any of the diffracted light beams of the other orders.

As in the first specified embodiment, the optical system is such a one where collimated light is incident on the imaging unit 45, made up by the objective lens 41, a first diffractive element 42, a second diffractive element 44 and an optical plate 43, or on the imaging unit 45, made up by the objective lens 41, a third diffractive element 46, a fourth diffractive element 47 and an optical plate 43.

Figure 14:
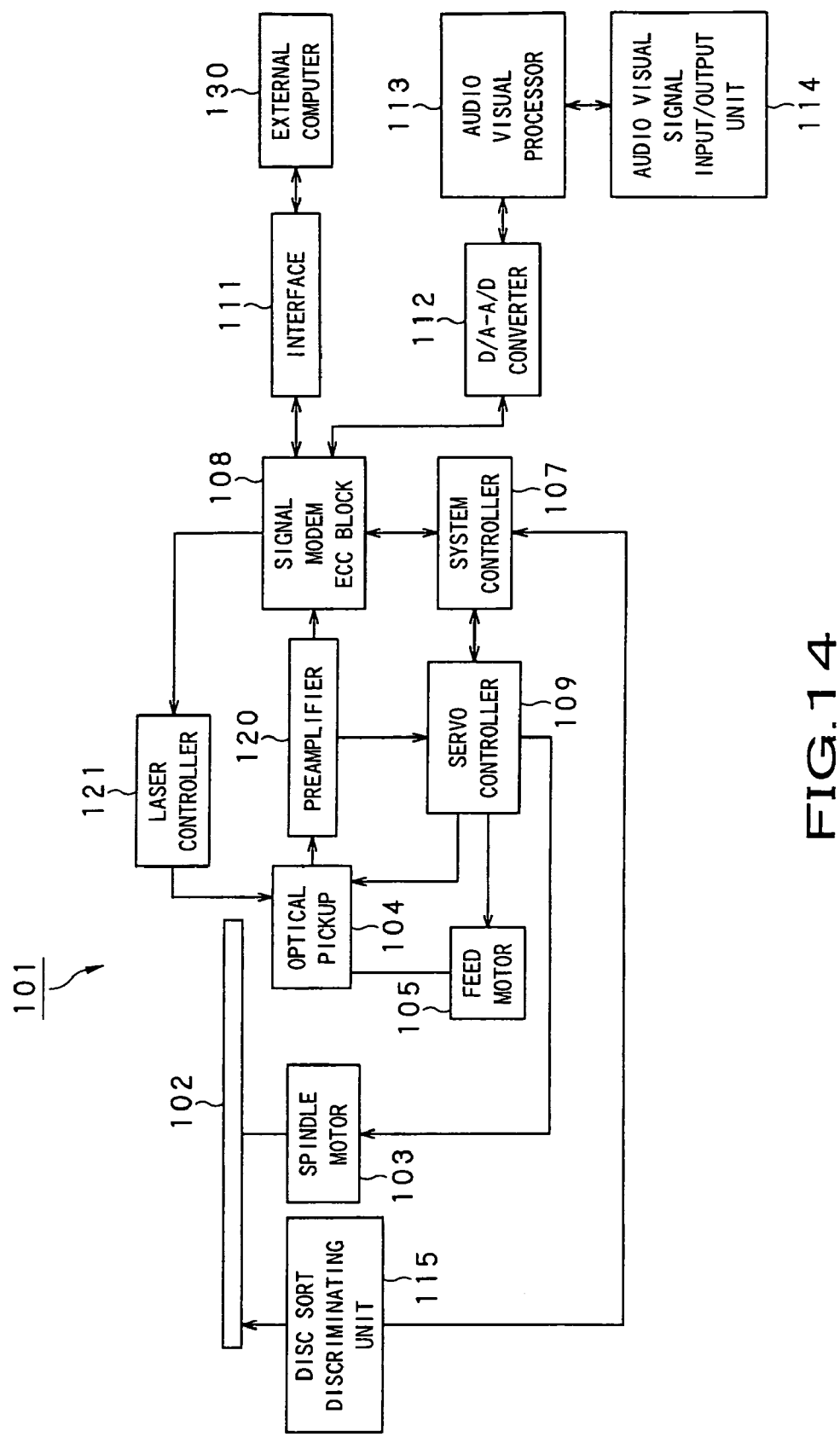
FIG. 14 is a block diagram showing a recording and/or reproducing apparatus for an optical pickup shown as embodying the present invention.

FIG. 14 shows a recording and/or reproducing apparatus for an optical disc, employing an optical pickup, shown as an embodiment of the present invention.

An optical disc recording and/or reproducing apparatus 101 includes a spindle motor 103, as driving means for rotationally driving an optical disc 102, as a recording medium, an optical pickup 104 according to the present invention, and a feed motor 105 as driving means for the optical pickup. This optical disc recording and/or reproducing apparatus 101 is an apparatus which has implemented compatibility for three standards for enabling recording and/or reproduction of three types of the optical discs 102 having different formats.

The optical discs usable in association with the present concrete example may be enumerated by a BD, employing a light beam with a wavelength of 405 nm, as recording and/or reproducing light, a DVD, employing a light beam with a wavelength of 655 nm, as recording and/or reproducing light, and a CD, employing a light beam with a wavelength of 785 nm, as recording and/or reproducing light. The optical discs 61 to 63, already explained, correspond to the optical disc 102 of FIG. 14.

The spindle motor 103 and the feed motor 105 are run, depending on the disc types, under control by a servo controller 109, operating under commands from a system controller 107, also operating as disc type discriminating means. For example, the spindle motor and the feed motor are run at a preset rpm as determined for each of the optical discs 61 to 63.

The optical pickup 104 is an optical pickup having an optical system compatible for three waveforms explained with reference to FIGS. 2, 3, 5, 6, and 8 to 13, and radiates light beams of different wavelengths to recording layers of the optical discs of different standards, while detecting the light reflected from the recording layers. The optical pickup 104 sends signals associated with the light beams to a preamplifier 120.

An output of the preamplifier 120 is sent to a signal modem error correction coding block, referred to below as a signal modem ECC block 108. This signal modem ECC block 108 takes charge of signal modulation/demodulation and appendage of ECC (error correction codes). The optical pickup 104 illuminates a light beam on a recording layer of a rotating optical disc 102, in association with a command from the signal modem ECC block 108, for recording and/or reproducing signals for the optical disc 102.

The preamplifier 120 is configured for generating e.g. focusing error signals, tracking error signals or RF signals, based on signals matched to the light beams detected from one format to another. Depending on the sorts of the optical recording mediums, being recorded and/or reproduced, preset processing operations, such as demodulation and error correction processing operations, in keeping with the standards for BD, DVD and CD, are carried out by a servo control circuit 109 or the signal modem ECC block 108.

In case the recording signals, demodulated by the signal modem ECC block 108, are those for data to be stored on a computer, the recording signals are sent out to an external computer 130 via an interface 111. The external computer 130, for example, may then receive signals, recorded on the optical disc 102, as replay signals.

In case the recording signals, demodulated by the signal modem ECC block 108, are audio/visual signals, these signals are subjected to digital-to-analog conversion in a D/A converter of a D/A-A/D converter 112, and sent to an audio/visual processor 113, from which the signals processed are sent via audio visual signal input/output unit 114 to an external imaging/projector apparatus, not shown.

In the optical pickup 104, control of the feed motor 105 for causing movement of the optical pickup to a preset recording track on the optical disc 102, control of the spindle motor 103, and actuation along the focusing direction and along the tracking direction of the bi-axial actuator, holding the objective lens, operating as light condensing means in the optical pickup 104, is taken charge of by a servo controller 109.

The servo controller 109 actuates an optical coupling efficiency varying element, provided within the optical pickup 104, to exercise control in such a manner that the optical coupling efficiency in the optical pickup 104, that is, the ratio of the light volume condensed on the optical disc 102 to the total volume of the light beam radiated from a laser light source, such as a semiconductor laser device, will be varied depending on the operating mode, that is, the recording mode or the reproducing mode, or on the sort of the optical disc 102.

A laser controller 121 controls the laser light source of the optical pickup 104. In particular, in the present embodiment, the laser controller 121 exercises control so that the output power of the laser light source for the recording mode will differ from that for the reproducing mode. The laser controller 121 also exercises control so that the output power of the laser light source will differ depending on the sort of the optical disc 102. The laser controller 121 switches between the laser light sources of the optical pickup 104 depending on the sort of the optical disc 102 detected by a disc sort discriminating unit 115.

The disc sort discriminating unit 115 is able to detect different formats of the optical discs 102 from e.g. the difference in surface reflectivity or in outer shape of the BD, DVD and CD. The blocks that make up the optical disc recording and/or reproducing apparatus 101 are designed and constructed so that signal processing matched to specifications of the optical disc loaded may be made depending on the detected results in the disc sort discriminating unit 115.

The system controller 107 discriminates the sorts of the optical disc 102 based on the detected results sent from the disc sort discriminating unit 115. Among the techniques for discriminating the sorts of the optical disc, there is such a technique in which, in case the optical recording medium is housed in a cartridge, a detection hole is bored in the cartridge and a contact detection sensor or a push switch is used to detect the hole.

A servo control circuit 109, operating as optical coupling efficiency control means, is controlled by the system controller 107 to control the optical coupling in the optical pickup 104 depending on the discriminated results of the disc sort discriminating unit 115. The servo control circuit 109 discriminates a recording area to be recorded and/or reproduced by, for example, detecting the relative position between the optical pickup 104 and the optical disc 102. The relative position may also be detected based on an address signal recorded on the disc 102. The servo control circuit 109 controls the optical coupling efficiency in the optical pickup 104, depending on the results of discrimination of the recording area to be recorded and/or reproduced.

With the optical disc recording and/or reproducing apparatus, described above, it is possible to cope successfully with spherical aberration, produced in employing the same optical system for three standards of BD, DVD and CD, by employing the optical pickups explained with reference to FIGS. 2, 3, 5, 6, and 8 to 13, without lowering the transmission diffraction efficiency for systems employing the light beams of the wavelengths of 405, 655 and 785 nm.

The optical pickup present invention may be applied to disc formats other than those described in the embodiments, provided that the optical pickup uses light beams of different wavelengths for recording and/or reproducing the optical recording mediums having different protective substrate thicknesses. For example, the optical disc may be any of recording and/or reproducing discs of various systems employing optical modulation recording, optical discs, including magneto-optical discs, phase change recording discs or dye recording discs, more specifically, any of a large variety of photo-magnetic recording mediums, including 'CD-R/RW', 'DVD-RAM', 'DVD–R/RW' or 'DVD+RW'. The optical disc may be such a disc the recording layer of which is divided into at least two recording areas having different optimum recording and/or reproducing light power values, or such a disc including plural recording layers deposited together via transparent substrates.

It should be understood by those skilled in the art that various modifications, combinations sub-combinations and alterations may occur depending on design requirements and other factors insofar as they are within the scope of the appended claims or the equivalents thereof.

What is claimed is:

1. An optical pickup comprising:
    a first light source radiating a light beam of a first wavelength;
    a second light source radiating a light beam of a second wavelength;
    a third light source radiating a light beam of a third wavelength;
    light receiving means for receiving the light beams from the first to third light sources, reflected from a plurality of optical recording mediums having different protective substrate thicknesses, and for converting the received light beams into electrical signals, the optical pickup radiating light beams of different wavelengths and different numerical apertures to the individual optical recording mediums; and
    an imaging unit composed of an objective lens and a set of diffraction means and adapted for condensing the light beams from the first to third light sources on the optical recording mediums, wherein,
    the set of diffraction means further comprises:
    first diffraction means which gives the transmission diffraction efficiency for order-one diffracted light or order-minus-one diffracted light higher than that for light of the other orders in case the light beams of the first, second and third wavelengths are transmitted therethrough; and
    second diffraction means which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for diffracted light of the other orders in case the remaining light beam is transmitted therethrough,
    wherein one of the diffraction means in the set of diffraction means is provided to the objective lens and the other diffraction means of the set is provided to an optical plate member secured to the objective lens so that the first and second diffraction means face each other,
    wherein the first diffractive means provided to the objective lens having the NA, the pitch at the outermost rim, and the groove depth being 0.6, approximately 10 µm, and approximately 0.95 µm, respectively, and wherein the second diffractive means provided to the optical plate having the NA, the pitch at the outermost rim, and the groove depth being 0.6, approximately 90 µm, and approximately 0.68 µm, respectively.

2. The optical pickup according to claim 1, wherein collimated light is incident on the imaging unit.

3. The optical pickup according to claim 1, wherein one of the diffraction means of the set of diffraction means is a blade type diffraction element having a serrated cross-sectional shape, and wherein the other diffraction means is a stepped diffraction element having a stepped cross-sectional shape.

4. The optical pickup according to claim 3, wherein the blade type diffraction element has a groove depth such that the transmitted diffraction efficiency of the order-one or order-minus-one diffracted light is higher than that of diffracted light of the other orders in case the light beams of the first wavelength, second wavelength and the third wavelength are transmitted therethrough, and wherein the stepped diffraction element has a groove depth such that the transmitted diffraction efficiency of the order-zero diffracted light is higher than that of diffracted light of the other orders in case the light beam of the shortest wavelength and the light beam of the longest wavelength out of the light beams of the first to third wavelengths are transmitted therethrough, and also such that the transmitted diffraction efficiency of the order-one diffracted light or the order-minus-one diffracted light is higher than that of diffracted light of the other orders in case the remaining light beam is transmitted therethrough.

5. A recording and/or reproducing apparatus for an optical recording medium for rotationally driving each of a plurality of optical recording mediums having different protective substrate thicknesses, the apparatus comprising:

an optical pickup moved by feed means along the radius of said optical recording medium for carrying out recording and/or reproduction by light beams having different wavelengths and different numerical apertures, depending on the sorts of the optical recording mediums, the apparatus controlling the rotation of the optical recording mediums and movement of the optical pickup in keeping with the recording and/or reproducing operation, wherein, the optical pickup further comprises:

an imaging unit composed of an objective lens and a set of diffraction means and adapted for condensing the light beams from the first to third light sources on the optical recording mediums, and the set of diffraction means further comprises:

first diffraction means which gives the transmission diffraction efficiency for order-one diffracted light or order-minus-one diffracted light higher than that for diffracted light of the other orders in case the light beams of the first, second and third wavelengths are transmitted therethrough; and second diffraction means which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for light of the other orders in case the other light beam is transmitted therethrough, wherein one of the diffraction means in the set of diffraction means is provided to the objective lens and the other diffraction means of the set is provided to an optical plate member secured to the objective lens so that the first and second diffraction means face each other, wherein the first diffractive means provided to the objective lens having the NA, the pitch at the outermost rim, and the groove depth being 0.6, approximately 10 µm, and approximately 0.95 µm, respectively, and wherein the second diffractive means provided to the optical plate having the NA, the pitch at the outermost rim, and the groove depth being 0.6, approximately 90 µm, and approximately 0.68 µm, respectively.

6. The recording and/or reproducing apparatus for an optical recording medium according to claim 5, wherein collimated light is incident on said imaging unit.

7. The optical pickup according to claim 5, wherein one of the diffraction means of the set of diffraction means is a blade type diffraction element having a serrated cross-sectional shape, and wherein the other diffraction means is a stepped diffraction element having a stepped cross-sectional shape.

8. The optical pickup according to claim 7, wherein the blade type diffraction element in the set of diffraction means has a groove depth such that the transmitted diffraction efficiency of the order-one or order-minus-one diffracted light is higher than that of the diffracted light of the other orders in case the light beams of the first wavelength, second wavelength and the third wavelength are transmitted therethrough, and wherein the stepped diffraction element has a groove depth such that the transmitted diffraction efficiency of the order-zero diffracted light is higher than that of the diffracted light of the other orders in case the light beam of the shortest wavelength and the light beam of the longest wavelength out of the light beams of the first to third wavelengths are transmitted therethrough, and such that the transmitted diffraction efficiency of the order-one diffracted light or the order-minus-one diffracted light is higher than that of the diffracted light of the other orders in case the remaining light beam is transmitted therethrough.

9. An optical pickup comprising:

a first light source radiating a light beam of a first wavelength;

a second light source radiating a light beam of a second wavelength;

a third light source radiating a light beam of a third wavelength;

a light receiving section receiving the light beams from said first to third light sources, reflected from a plurality of optical recording mediums having different protective substrate thicknesses, and for converting the received light beams into electrical signals, the optical pickup radiating light beams of different wavelengths and different numerical apertures to the individual optical recording mediums; and an imaging unit composed of an objective lens and a set of diffraction sections and adapted for condensing the light beams from the first to third light sources on the optical recording mediums, wherein, the set of diffraction sections further comprises:

a first diffraction section which gives the transmission diffraction efficiency for order-one diffracted light or order-minus-one diffracted light higher than that for light of the other orders in case the light beams of the first, second and third wavelengths are transmitted therethrough; and a second diffraction section which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for diffracted light of the other orders in case the remaining light beam is transmitted therethrough, wherein one of the diffraction sections in the set of diffraction sections is provided to the objective lens and the other diffraction section of the set is provided to an optical plate member secured to the objective lens so that the first and second diffraction sections face each other, wherein the first diffractive section provided to the objective lens having the NA, the pitch at the outermost rim, and the groove depth being 0.6, approximately 10 μm, and approximately 0.95 μm, respectively, and wherein the second diffractive section provided to the optical plate having the NA, the pitch at the outermost rim, and the groove depth being 0.6, approximately 90 μm, and approximately 0.68 μm, respectively.

10. A recording and/or reproducing apparatus for an optical recording medium for rotationally driving each of a plurality of optical recording mediums having different protective substrate thicknesses, the apparatus comprising:

an optical pickup moved by a feed section along the radius of the optical recording medium for carrying out recording and/or reproduction by light beams having different wavelengths and different numerical apertures, depending on the sorts of the optical recording mediums, the apparatus controlling the rotation of the optical recording mediums and movement of the optical pickup in keeping with the recording and/or reproducing operation, wherein, the optical pickup further comprises:

an imaging unit composed of an objective lens and a set of diffraction sections and adapted for condensing the light beams from the first to third light sources on the optical recording mediums, and the set of diffraction sections further comprises:

a first diffraction section which gives the transmission diffraction efficiency for order-one diffracted light or order-minus-one diffracted light higher than that for diffracted light of the other orders in case the light beams of the first, second and third wavelengths are transmitted therethrough; and a second diffraction section which gives the transmission diffraction efficiency for order-zero diffracted light higher than that for light of the other orders in case the light beam of the shortest wavelength and the light beam of the longest wavelength out of the first, second and third wavelengths are transmitted therethrough, and the transmission diffraction efficiency for order-one diffracted light or order-minus-one diffracted light higher than that for light of the other orders in case the other light beam is transmitted therethrough, wherein one of the diffraction sections in the set of diffraction sections is provided to the objective lens and the other diffraction section of the set is provided to an optical plate member secured to the objective lens so that the first and second diffraction sections face each other, wherein the first diffractive section provided to the objective lens having the NA, the pitch at the outermost rim, and the groove depth being 0.6, approximately 10 μm, and approximately 0.95 μm, respectively, and wherein the second diffractive section provided to the optical plate having the NA, the pitch at the outermost rim, and the groove depth being 0.6, approximately 90 μm, and approximately 0.68 μm, respectively.

\* \* \* \* \*